United States Patent
Wang et al.

(10) Patent No.: US 9,537,978 B2
(45) Date of Patent: Jan. 3, 2017

(54) COMPRESSION DEVICES, DECOMPRESSION DEVICES, COMPRESSION METHODS, AND DECOMPRESSION METHODS

(71) Applicant: Agency for Science, Technology and Research, Singapore (SG)

(72) Inventors: Haiguang Wang, Singapore (SG); Shoukang Zheng, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 172 days.

(21) Appl. No.: 14/384,529

(22) PCT Filed: Mar. 12, 2013

(86) PCT No.: PCT/SG2013/000099
§ 371 (c)(1),
(2) Date: Sep. 11, 2014

(87) PCT Pub. No.: WO2013/137823
PCT Pub. Date: Sep. 19, 2013

(65) Prior Publication Data
US 2015/0030036 A1      Jan. 29, 2015

(30) Foreign Application Priority Data

Mar. 12, 2012   (SG) ............................. 201201750-5
May 11, 2012    (SG) ............................. 201203475-7
(Continued)

(51) Int. Cl.
*H04L 29/06* (2006.01)
*H04W 52/02* (2009.01)
*H04W 72/04* (2009.01)

(52) U.S. Cl.
CPC .......... *H04L 69/04* (2013.01); *H04W 52/0229* (2013.01); *H04W 72/042* (2013.01)

(58) Field of Classification Search
CPC ........................................................ H04L 69/04
See application file for complete search history.

(56) References Cited

U.S. PATENT DOCUMENTS

2007/0047657 A1   3/2007  Toma
2010/0142426 A1*  6/2010  Taniuchi ............. H04W 52/028
                                                    370/311

(Continued)

OTHER PUBLICATIONS

Park, et al., TGah TIM Operation, IEEE 802.11-12/117r0 (Jan. 2012).

(Continued)

*Primary Examiner* — Brian D Nguyen
*Assistant Examiner* — Toan Nguyen
(74) *Attorney, Agent, or Firm* — K. David Crockett, Esq.; Niky Economy Syrengelas, Esq.; Crockett & Crockett, PC

(57) ABSTRACT

The present invention is directed to a compression device including an identifier determination circuit configured to determine a first identifier value identifying a first communication terminal of a network, and a second identifier value identifying a second communication terminal of the network; a differential determination circuit configured to determine a differential value based on a difference between the first identifier value and the second identifier value; and a compressed string generation circuit configured to insert the differential value into a compressed string. A compression method, a decompression device and a decompression method are also disclosed.

13 Claims, 19 Drawing Sheets

(30) Foreign Application Priority Data

Sep. 12, 2012 (SG) ................................ 201206797-1
Oct. 15, 2012 (SG) ................................ 201207676-6
Nov. 9, 2012 (SG) ................................ 201208310-1

(56) References Cited

U.S. PATENT DOCUMENTS

| | | | |
|---|---|---|---|
| 2010/0189021 A1 | 7/2010 | He et al. | |
| 2011/0128947 A1* | 6/2011 | Liu | H04L 25/03343 |
| | | | 370/338 |
| 2011/0317630 A1* | 12/2011 | Zhu | H04W 74/0816 |
| | | | 370/329 |
| 2012/0087358 A1* | 4/2012 | Zhu | H04W 72/042 |
| | | | 370/338 |
| 2013/0329620 A1* | 12/2013 | Kim | H04W 52/0229 |
| | | | 370/311 |

OTHER PUBLICATIONS

IEEE Standards Association, Part 11: Wireless LAN Medium Access Control (MAC) and Physical Layer (PHY) Specifications, IEEE Std 802.11-2012 (Mar. 2012).
Park, Proposed Specification Framework for TGah, IEEE 802.11-11/1137r10 (Jul. 2012).

\* cited by examiner

COMPRESSION DEVICES, DECOMPRESSION DEVICES, COMPRESSION METHODS, AND DECOMPRESSION METHODS

CROSS-REFERENCE TO RELATED APPLICATION

This application claims the benefit of priority of Singapore patent applications Nos. 201201750-5 (filed on 12 Mar. 2012), 201203475-7 (filed on 11 May 2012), 201206797-1 (filed on 12 Sep. 2012), 201207676-6 (filed on 15 Oct. 2012), and 201208310-1 (filed on 9 Nov. 2012), the contents of which being hereby incorporated by reference in their respective entirety for all purposes.

TECHNICAL FIELD

Embodiments relate generally to compression devices, decompression devices, compression methods, and decompression methods.

BACKGROUND

In the current Institute of Electrical and Electronics Engineers (IEEE) 802.11 standard, an authenticated device (STA) wishing to join an infrastructure network needs to first send an Association Request to an access point (AP).

The STA is considered to be associated with the AP when an Association Response with a status code value of 'successful' is acknowledged by the STA. The association process 100 is illustrated in FIG. 1 for a STA 102 successfully associated with an AP 104.

As seen in FIG. 1, the STA 102 sends an Association Request 106 to the AP 104. In response, the AP 106 sends an Association Response including an Association Identity or Association ID (AID) 108 to the STA 102. Upon receiving the Association Response including the AID 108, the STA 102 sends an acknowledgement frame (ACK) 110 to the AP 104. Thus, each successfully-associated STA has an AID. At times, the STA may also need to re-associate with the AP (e.g. after AP power down). The procedure of re-association may be similar to FIG. 1. In re-association, the AP may re-assign another AID to the STA.

The IEEE 802.11 supports power-saving mode operation. A STA may go to power saving (PS) mode and only listen periodically to beacon messages to check whether there is any data buffered for it in the AP. If there is data for a STA while it is in PS mode, the AP buffers the data and informs the STA. This is achieved via the traffic indication map (TIM) information element (IE) in the beacon message. The TIM element format includes a partial virtual bitmap (or referred to as the traffic indication virtual bitmap).

Typically, the traffic indication virtual bitmap consists of a maximum of 2008 bits. Bit 1 to Bit 2007 in the traffic indication virtual bitmap corresponds to STA with AID 1 to 2007, respectively. When the bit is set to 1, it indicates that there is data buffered in the AP for the corresponding STA. When the bit is 0, it indicates that there is no data buffered in the AP for the corresponding STA.

Short beacon, according to the 11-12-0129-02-00ah-short-beacon of framework specification, may send TIM. Short Beacon interval, in units of time units (TUs), requires that the beacon interval is an integer multiple of the Short Beacon interval. Frame control (FC) type/subtype indication for the Short Beacon. Short Beacon may include a compressed service set identification (SSID) field. Short Beacon may include a 4-byte Timestamp containing the 4 least significant bits (LSBs) of the AP Timestamp. Short Beacon may include a 1-byte Change Sequence Field that is incremented whenever critical network information changes. Short Beacon optionally includes a field indicating duration to next full beacon.

With respect to TIM operation (11-12-0129-02-00ah-short-beacon), the AP may divide the complete traffic indication bitmap into one or more segments and transmits in one or more TIM elements for a large network. When the complete traffic indication bitmap is divided into multiple segments, each segment shall indicate the range of the AIDs (bitmap) it is covering.

In Extended TIM (referred to 11-12-0102-02-00ah-enhanced-power-save-for-large-bss), the AP may allocate its associated stations (STAs) or may be referred to as communication terminals to different groups and matches each group's TIM to its awake target beacon transmission time (TBTT). The AP notifies the TBTT and the sleep interval of each group. Long sleep interval is supported through grouping of STAs.

The TIM may be compressed when necessary. However, the current method only compresses according to only one TIM. Although the TIM may be split into a few parts to be transmitted, the STAs may not be able to pull the traffic due to low data rate and beacon interval. For example, if 100 bytes MAC Protocol Data Unit (MPDU) is considered with 14 bytes ACK, the air transmission time for 200 Kbps data rate is 114*8/200000=4.56 ms, which is considerably long. Actually the transmission time may be longer due to the back-off to avoid contention where power-save (PS) Poll, PHY overhead (at the physical layer) and Inter-Frame Spaces (IFSs) are needed. In this example, 100 ms beacon interval allows about 100/5=20 STAs to complete. Thus, 6000 STAs may need about 6000/20=300 beacon intervals which takes up to 30 s which may be a relatively long delay.

Thus, there is a need to provide mechanisms seeking to reduce the size of the TIM to address at least the problems above and improve the efficiency of the TIM IE.

SUMMARY OF THE INVENTION

According to an embodiment, a compression device is provided. The compression device includes an identifier determination circuit configured to determine a first identifier value identifying a first communication terminal of a network, and a second identifier value identifying a second communication terminal of the network; a differential determination circuit configured to determine a differential value based on a difference between the first identifier value and the second identifier value; and a compressed string generation circuit configured to insert the differential value into a compressed string.

According to an embodiment, a compression method is provided. The compression method includes determining a first identifier value identifying a first communication terminal of a network, and a second identifier value identifying a second communication terminal of the network; determining a differential value based on a difference between the first identifier value and the second identifier value; and inserting the differential value into a compressed string.

According to an embodiment, a decompression device is provided. The decompression device includes a compressed string receiver configured to receive a compressed string including a differential value, wherein the differential value is based on a difference between a first identifier value identifying a first communication terminal of a network, and a second identifier value identifying a second communication terminal of the network; a retrieving circuit configured to determine the differential value from the compressed string; and an identifier generating circuit configured to determine the first identifier value and the second identifier value based on the differential value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of a method are analogously valid for a device, and vice versa.

In the context of various embodiments, the articles "a", "an" and "the" as used with regard to a feature or element includes a reference to one or more of the features or elements.

In the context of various embodiments, the phrase "at least substantially" may include "exactly" and a reasonable variance.

As used herein, the term "and/or" includes any and all combinations of one or more of the associated listed items.

Figure 1:
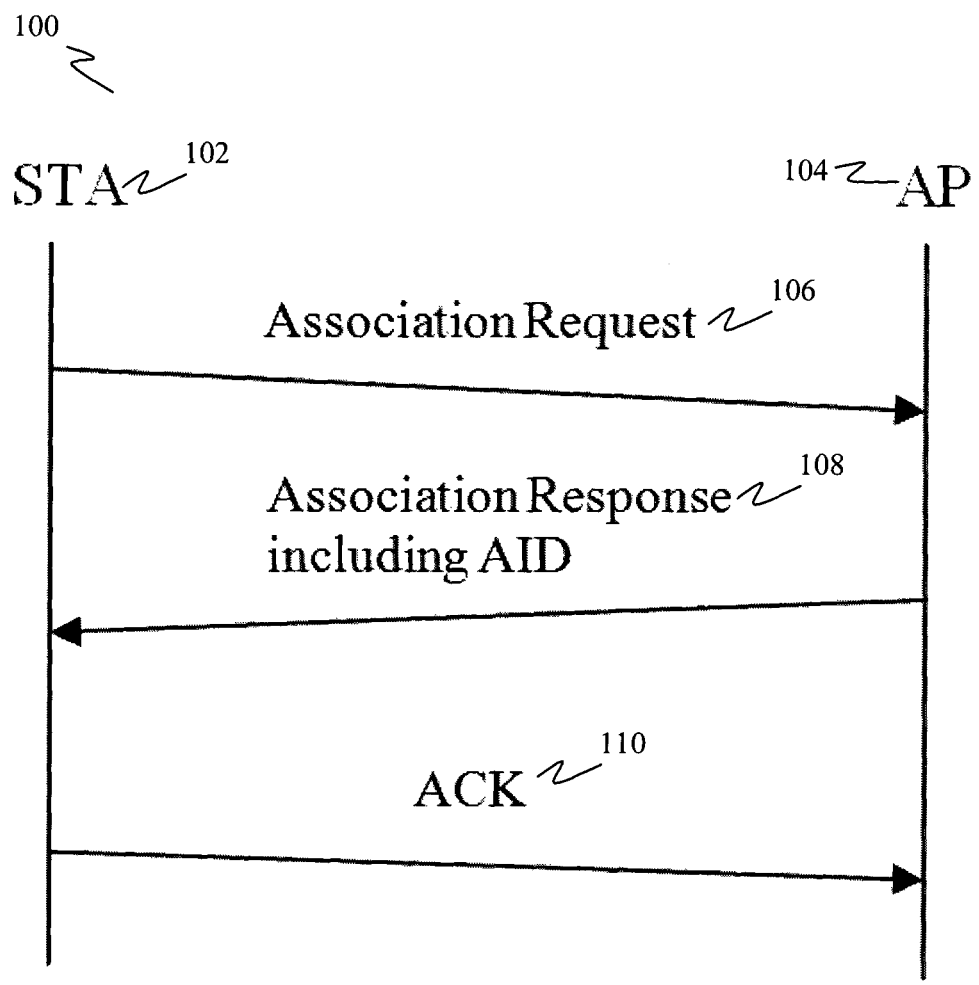
FIG. 1 shows a schematic diagram of an association process.
Figure 2A:
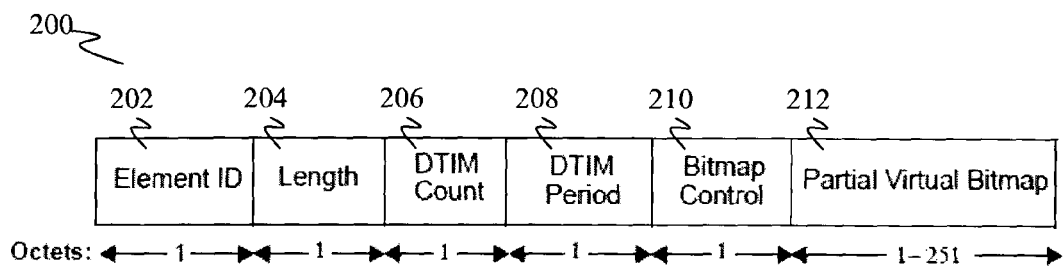
FIG. 2A shows a traffic indication map information element (TIM IE) frame format, in accordance to various embodiments.

Generally, the TIM may be included in or may be part of the TIM IE. The TIM element format is shown in FIG. 2A. The TIM element format 200 includes 1-octet element ID 202, 1-octet length 204, 1-octet delivery traffic indication message (DTIM) count 206, 1-octet DTIM period 208, 1-octet bitmap control 210, and 1-octet to 251-octet partial virtual bitmap 212. DTIM period specifies the period that an access point (AP) sends out buffered broadcast and multi-cast to sleep stations. When DTIM count becomes zero, the multi-cast/broadcast is sent out. All stations that intend to receive group addressed (multi-cast/broadcast) traffic have to wake up to listen for the multi-cast/broadcast messages. In other words, a station can choose not to listen to the traffic is it does not listen to delivery traffic indication message beacon. The bitmap control 210 and partial virtual bitmap 212 specifies whether multi-cast/broadcast packets presents or stations that have data packet in the buffer.

Various embodiments may provide for TIM compression to improve its efficiency.

Figure 2B:
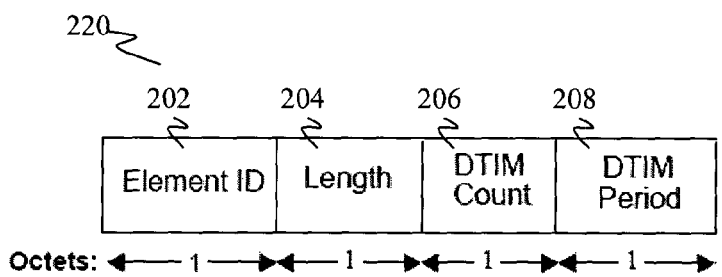
FIG. 2B shows a reduced TIM IE frame format, in accordance to various embodiments.

In one example, when the bitmap control field 210 is zero and all bits in the bitmaps are also zero, the AP may transmit a TIM IE that takes a reduced format 220 as shown in FIG. 2B. A station may know whether other control field appears in the TIM IE based on the length field 204. A station may also know that all bits of TIM Bitmap, or part of the TIM bitmap, that is supposed to be carried by this TIM IE are zero.

In a different example, besides using the bitmap, another way to indicate that data packets are in the buffer of the AP for a certain station is to carry its Association ID (AID) directly in the TIM IE. Since the AID may vary from 1 to a few thousand, it is necessary to let the station to know how many bits are used to represent an AID so that they can locate whether their AID are present in the TIM IE or not. Therefore, a field may be used to indicate the number of bits used to represent an AID in the TIM IE.

Figure 2C:
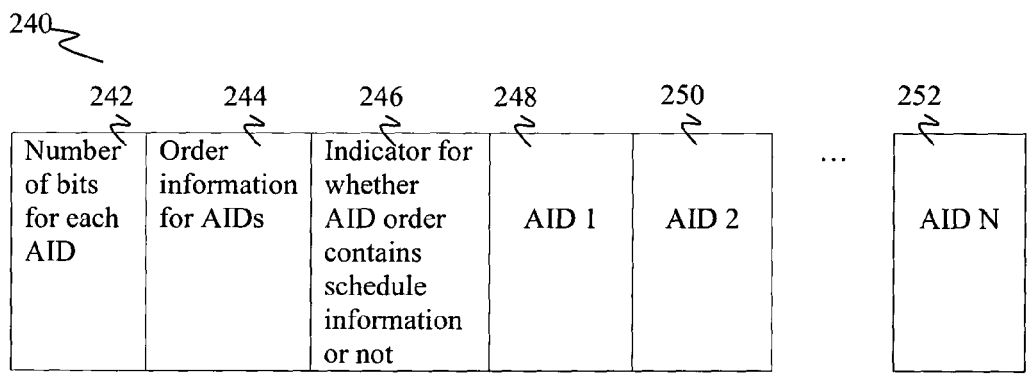
FIG. 2C shows a TIM IE frame format when AID is used as traffic indicator, in accordance to various embodiments.
Figure 3:
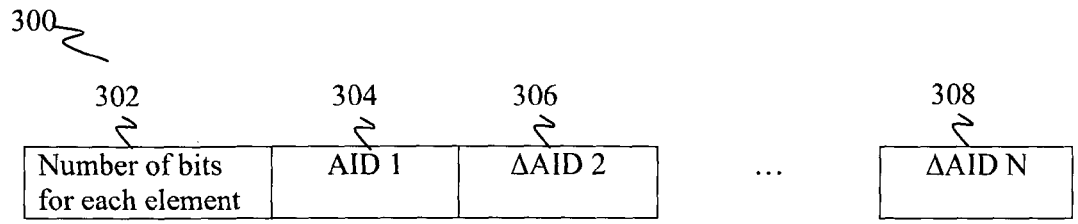
FIG. 3 shows an example of a compressed format with AID differential encoding that is the encoded bitmap part of TIM IE, in accordance to various embodiments.

Considering the AID may not be placed in order in the TIM IE, another control field may be used to indicate whether the AID is arranged in ascending/descending order or in other orders. The AP may also use a value/field to indicate whether stations use the order of AID in scheduling or transmission data/control message such as PS-Poll. An example format of the traffic indication message format 240 is shown in FIG. 2C, which may be part of the TIM IE defined in the IEEE 802.11 standard concatenated after the control field such as DTIM Count 206, DTIM period 208 and possibly the bitmap control field 210. In FIG. 2C, the traffic indication message format 240 includes the following fields: number of bits for each AID 242, order information for AIDs 244, indicator for whether AID order contains schedule information or not 246, AID 1 248, AID 2 250, AID N 252.

When using the AID directly as a traffic indicator, the size of the TIM IE increases linearly when the number of AIDs included in the IE increases.

Various embodiments relate to a device providing differential encoding that slows down the increase in the TIM IE size. The device may include a memory which is for example used in the processing carried out by the remote unit. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, instead of putting the value of AID directly in the TIM IE (as in FIG. 2C), at the AP or stations that transmit the TIM IE, only the difference between the current AID and the AID immediately before this AID may be included in the TIM IE. The stations derive the AIDs based on the differences included in the TIM IE. Using the differential encoding, fewer bits may require to transmitting the traffic indication messages as compared to putting the value of AID directly in the TIM IE (FIG. 2C).

For example, assuming AID 1, AID 2, . . . , AID N are included in the TIM IE, the differential encoding may provide for only AID 1 304, ΔAID 2 306, . . . , ΔAID N 308 to be included in the bitmap 300, where the first AID (i.e., AID 1 304) may be encoded with its original value or values that may be used to derive the absolute value of AID 1 304, and the rest are encoded with differences where each of them is given by $\Delta AID_i = AID_i - AID(i-1)$, $i=2, 3, \ldots, n$. The encoding of the AID 1 304 may be different from the rest of ΔAIDi (e.g., ΔAID 2 306, . . . , ΔAID N 308) and may take a fixed length such as n bit if necessary. The AP may notify stations regarding the length of AID 1 304 via a control message or by using a predefined value.

In order that the invention may be readily understood and put into practical effect, particular embodiments will now be described by way of examples and not limitations, and with reference to the figures.

Figure 4A:
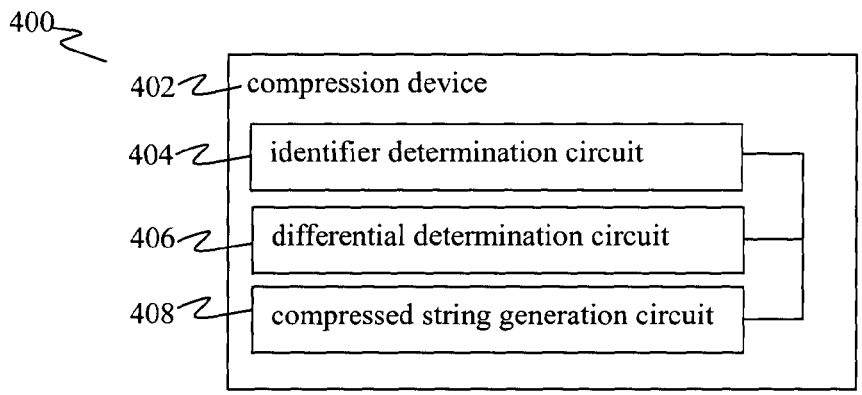
FIG. 4A shows a schematic diagram of a compression device, in accordance to various embodiments.

FIG. 4A shows a schematic block diagram 400 of a compression device 402, according to various embodiments. The compression device 402 includes an identifier determination circuit 404 configured to determine a first identifier value identifying a first communication terminal of a network, and a second identifier value identifying a second communication terminal of the network; a differential determination circuit 406 configured to determine a differential value based on a difference between the first identifier value and the second identifier value; and a compressed string generation circuit 408 configured to insert the differential value into a compressed string.

In other words, the compression device 402 computes the difference between two identifier values (or AIDs) and includes this difference in a compressed string. The difference results in a smaller value as compared to at least the larger of the two identifier values, thereby requiring less number of bits to represent the difference as compared to the number of bits required to represent at least the larger of the two identifier values. With less number of bits included in the string, the string may reduce in size, thereby compressing the string.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code such as e.g., Java. Any other kind of implementation of the respective functions which will be described in more detail below may also be understood as a "circuit" in accordance with an alternative embodiment.

In the context of various embodiments, the term "compression device" may refer to an encoder or an encoding circuit.

As used herein, the term "communication terminal" may refer to a machine that assists data transmission, that is sending and/or receiving data information. Accordingly, the communication terminal may also be generally referred to as a node. For example, a communication terminal may be but is not limited to, a station (STA), or a substation, or a mobile station (MS), or a port, or a mobile phone, or a computer, or a laptop.

In one embodiment, the communication terminal may include a mobile device or a station.

For example, the communication terminal may be configured to operate according to an IEEE 802.11 communication standard.

In various embodiments, the access point may be configured to operate according to an IEEE 802.11 communication standard.

The term "network" may be a communication network operating according to an IEEE 802.11 communication standard. For example, the network may be a WiFi network.

The WiFi network may be a WiFi which may be deployed by service providers (SPs) or a WiFi which may not be deployed by SPs.

The term "determine" may refer to "evaluate", "compute", "obtain", or "check".

The term "difference" refer to the mathematical operation of substraction.

The term "compressed string" may be referred to as a bitmap, a compressed bitmap, an encoded bitmap, a sequence, or a series. For example, the compressed string may be but is not limited to the (ADE) field structure 500 of FIG. 5A, or the ADE block 520 of FIG. 5B, or the field structure 600 of FIG. 6A, or the field structure 700 of FIG. 7A, or the field structure 720 of FIG. 7B, which will be described in more details below.

The term "insert" may refer to "include" or "append".

In various embodiments, for the first communication terminal data is present in an access point operating in the network; and for the second communication terminal data is present in the access point.

The phrase "for the first communication terminal data is present in an access point" may relate to a bit status of a traffic indication map (TIM) virtual bitmap. For example, if for the first communication terminal data is present in the access point, the bit (in the TIM virtual bitmap) associated with the first communication terminal may be set at "1". If for the first communication terminal data is not present in the access point, the bit (in the TIM virtual bitmap) associated with the first communication terminal may be set at "0". In another example, the bit (in the TIM virtual bitmap) associated with the first communication terminal may be set at "0" if data for the first communication terminal is present in the access point, the bit (in the TIM virtual bitmap) associated with the first communication terminal may be set at "1" if data for the first communication terminal is not present in the access point. The same definition may be applied to the second communication terminal or any communication terminals in the network.

As used herein, the term "identifier value" may be a numerical value representing the communication terminal. This is different from the bit associated with the communication terminal as described above. As an illustrative example, in a network of, say, five communication terminals, they may be referred to as Communication Terminal No. 1, Communication Terminal No. 2, Communication Terminal No. 3, Communication Terminal No. 4, and Communication Terminal No. 5. In such a case, the identifier value for Communication Terminal No. 1 may be "1", the identifier value for Communication Terminal No. 2 may be "2", the identifier value for Communication Terminal No. 3 may be "3", the identifier value for Communication Terminal No. 4 may be "4", and the identifier value for Communication Terminal No. 5 may be "5".

In various embodiments, the first identifier value may be a first association identity (AID) of the first communication terminal.

In various embodiments, the second identifier value may be a second association identity (AID) of the second communication terminal.

In various embodiments, the compressed string generation circuit 408 may further be configured to insert into the compressed string an encode word length (EWL) field indicating the number of bits required for representing the differential value. In one embodiment, the size of the encode word length (EWL) field may be 3 bits. For example, the EWL (e.g., the EWL 502 of FIG. 5A or the EWL 522 of FIG. 5B) may be appended to the differential value at the beginning of the compressed string.

Figure 5A:
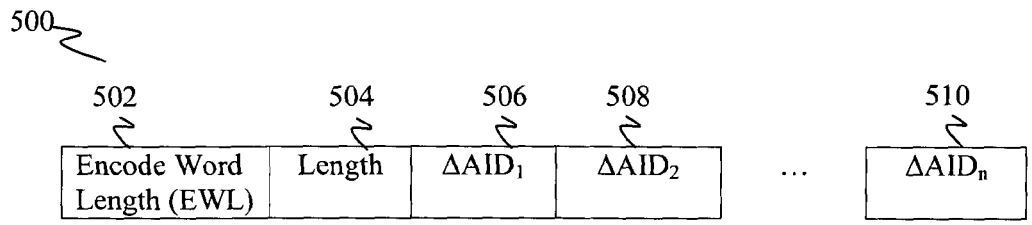
FIG. 5A shows an exemplary AID differential encoding (ADE) field structure, in accordance to various embodiments.
Figure 5B:
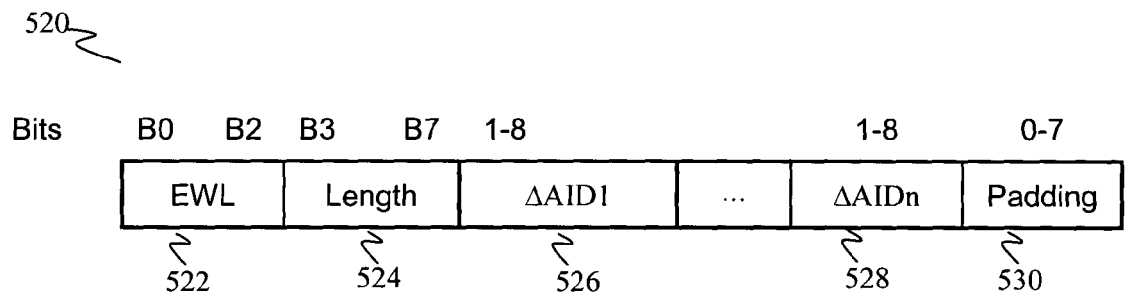
FIG. 5B shows an exemplary ADE block, in accordance to various embodiments.

In various embodiments, the compressed string generation circuit 408 may further be configured to insert into the compressed string a length field indicating the length of the compressed string excluding the encode word length (EWL) field and the length field. The length field may indicate the length of the compressed string in one or more octets. In other words, for example, the length field (or subfield) may specify the total length of a current ADE block in octets, excluding the EWL field and the length field. In one embodiment, the size of length field may be 5 bits. For example, the length field (e.g., the length field 504 of FIG. 5A or the length field 534 of FIG. 5B) may be inserted between the EWL (e.g., the EWL 502 of FIG. 5A or the EWL 522 of FIG. 5B) and the differential value (e.g., $\Delta AID_1$ 506 of FIG. 5A or $\Delta AID_1$ 526 of FIG. 5B). An example of the compressed string may have a structure as shown in FIG. 5A or 5B.

In one example, the compressed string may be referred to as an encoded block information field including the encode word length (EWL) field (or subfield), the length field (or subfield), n AID Differential Values ($\Delta AID$) fields (or subfields) and a padding field (or subfield), where n is the number of paged AIDs encoded in the ADE block. The EWL field (or subfield) may indicate a WL, which denotes the length of each $\Delta AID$ fields (or subfields) representing the encoded word length (i.e., the number of bits of each encoded words) of each AID. All WL have the same length. The values of EWL subfield ranging from 0 to 7 may represent WL being 1 to 8 respectively.

In one embodiment, the identifier determination circuit 404 may be configured to determine a plurality of identifier values in a block; and the compressed string generation circuit 408 may be configured to insert into the compressed string an encode word length field indicating that the number of bits required for representing the block is zero and a length field indicating that the length of the compressed string excluding the encode word length field and the length field is zero, if data is present in an access point operating in the network for each communication terminal of a plurality of communication terminals identified by the plurality of the identifier values.

The term "block" may refer to an ADE block.

In other words, for example, if all AIDs in the ADE blocks are paged, the compressed string may include the EWL and the length fields, where both the EWL and length fields are set to zero and the access point may set an inverse bit (in a bitmap control field of the TIM IE) to '1'. As used herein, the term "paged" refers to the AIDs with their corresponding bits being set to '1' if encoded by partial virtual bitmap.

In one embodiment, the identifier determination circuit 404 may be configured to determine a plurality of identifier values in a block; and the compressed string generation circuit 408 may be configured to insert into the compressed string an encode word length field with a value of 7, which may indicate that the number of bits required for representing the block is 8, a length field indicating that the length of the compressed string excluding the encode word length field and the length field is 1, and a sole differential value if data is not present in an access point operating in the network for one communication terminal of a plurality of communication terminals, wherein the one communication terminal is identified by one of the plurality of identifier values; and if data is present in the access point for the rest of the plurality of communication terminals identified by the rest of the plurality of identifier values, wherein the sole differential value is determined based on a difference between the one of the plurality of communication terminals and a sum of two factors, wherein the first factor is a product of a page index value and a page length, and the second factor is a product of a block offset value and a block length.

In other words, for example, if all but one AIDs are paged, the compressed string consists of only one differential value (ΔAID subfield or field). The EWL may be set to 7 and the length field may be set to one, and the access point may set an inverse bit (in a bitmap control field of the TIM IE) to '1'. The differential value (ΔAID) in this embodiment may be (the one AID−(PageIndex*a page length+Block Offset*a block length). For example, the page length may be but is not limited to 2048. The block length may be but is not limited to 64.

In various embodiments, the identifier determination circuit 404 may be configured to determine a plurality of identifier values in a block; and the compressed string generation circuit 408 may be configured to insert into the compressed string a single identifier value of the plurality of identifier values if data is present in an access point operating in the network for one communication terminal of a plurality of communication terminals, wherein the one communication terminal is identified by the single identifier value; and if data is not present in the access point for the rest of the plurality of communication terminals identified by the rest of the plurality of identifier values.

In other words, for example, if only one AID is paged in the ADE blocks, the access point may set an inverse bit to '0' and use single AID mode.

In various embodiments, the differential determination circuit 406 may be configured to determining a differential value based on subtracting 1 from the difference between the first identifier value and the second identifier value. Subtracting 1 to the differential value is performed considering that the minimal differential value for the first identifier value and the second identifier value (e.g. AIDs) is 1. This may be further illustrated in the above example depicting Communication Terminal Nos. 1 to 5. By subtracting 1, the size of the compressed string may be further reduced as compared to the case without applying a reduction of 1.

In various embodiments, the compression device 402 may further include an encoding circuit configured to perform encoding of the compressed string.

In one embodiment, the encoding circuit may be configured to perform encoding of the compressed string using Golomb coding. It should be appreciated that other forms of encoding taken alone or in combination may also be applied to the compressed string. This may be referred to as multiple encoding or multiple compressions.

In various embodiments, the compression device 402 may further include an inverse mode determining circuit configured to determine whether the number of bits of a predetermined state in the compressed string is larger than a predefined threshold.

In one embodiment, the predetermined state may be "1". In another example, the predetermined state may be "0".

The predefined threshold may be but is not limited to about 50% or more. For example, the predefined threshold may be about 60%, about 70%, about 80%, about 90% or about 100%. For example, if the total number of bits in the compressed string is 8 and the predefined threshold is 50%, then there should be at least 5 bits in the compressed string that are of the predetermined state. In another example, if the total number of bits in the compressed string is 16 and the predefined threshold is 80%, then there should be at least 13 bits in the compressed string that are of the predetermined state.

In various embodiments, the identifier determination circuit 404 may further be configured to determine a third identifier value identifying a third communication terminal of the network, wherein for the third communication terminal data is not present in the access point.

The term "identifier value" and "communication terminal" may be as defined above. As generally defined above, the phrase "data for the third communication terminal is not present in the access point", the bit (in the TIM virtual bitmap) associated with the third communication terminal may be set at "0" if bit="1" refers to data being present in the access point.

Figure 6A:
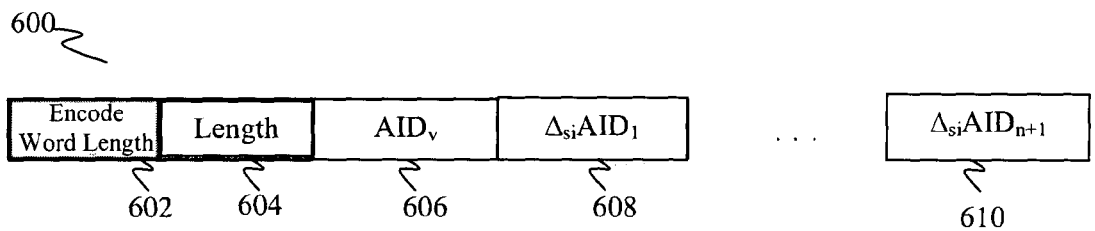
FIG. 6A shows an exemplary field structure for ADE with single interpolation, in accordance to various embodiments.
Figure 7A:
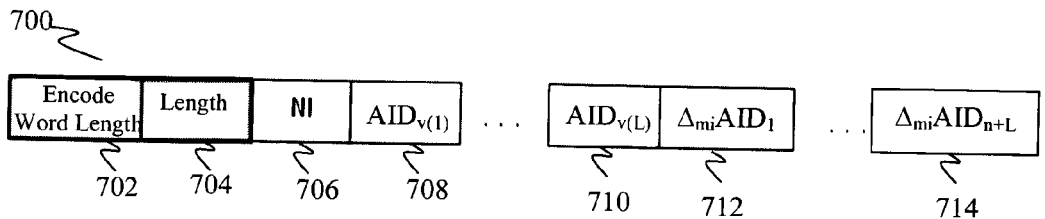
FIG. 7A shows an exemplary field structure for ADE with multiple interpolation, in accordance to various embodiments.
Figure 7B:
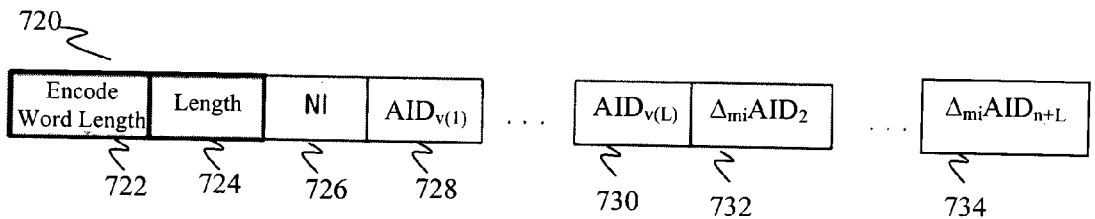
FIG. 7B shows an exemplary field structure for ADE with multiple interpolation variant, in accordance to various embodiments.

In various embodiments, the differential determination circuit 406 may further be configured to determine an interpolated differential value based on at least one of a difference between the third identifier value and the first identifier value, or a difference between the third identifier value and the second identifier value. The compressed string generation circuit 408 may further be configured to insert the interpolated differential value and the third identifier value into the compressed string. Example may be as shown in FIGS. 6A, 7A and 7B. A predetermined value, for example, a zero, may be used as an interpolating indicator to indicate that the third identifier is an interpolated value. Decompression device/method may derive based on the interpolating indicator that a given AID is an interpolate AID and there should be no data for the interpolated AID.

In one embodiment, the differential determination circuit 406 may further be configured to determine an interpolated differential value based on a difference between the first identifier value and second identifier value.

In one embodiment, the identifier determination circuit 404 may further be configured to determine a fourth identifier value identifying a fourth communication terminal of the network in addition to the third identifier value identifier as described above, wherein for the fourth communication terminal data is not present in the access point. In the embodiment, the differential determination circuit 406 may further be configured to determine an interpolated differential value based on a difference between the third identifier value and the fourth identifier value. The compressed string generation circuit 408 may further be configured to insert the interpolated differential value, the third identifier value and the fourth identifier value into the compressed string.

The term "third value" may refer to $AID_v$ 606 of FIG. 6A, $AID_{v(1)}$ 708 of FIG. 7A, $AID_{v(L)}$ 710 of FIG. 7A, $AID_{v(1)}$ 728 of FIG. 7B, or $AID_{v(L)}$ 730 of FIG. 7B. The term "interpolated differential value" may refer to one of the differential values between $\Delta_{si}AID_1$ 608 of FIG. 6A and $\Delta_{si}AID_{n+1}$ 610 of FIG. 6A, one of the differential values between $\Delta_{mi}AID_1$ 712 of FIG. 7A and $\Delta_{mi}AID_{n+L}$ 714 of FIG. 7A, $\Delta_{si}AID_k$ 622 of FIG. 6B, one of the differential values between $\Delta_{mi}AID_2$ 732 of FIG. 7B and $\Delta_{mi}AID_{n+L}$ 734 of FIG. 7B, $\Delta_{mi}AID_k$ 742 of FIG. 7C and $\Delta_{mi}AID_1$ 744 of FIG. 7C.

In various embodiments, the compression device may further include an arranging circuit configured to arrange the first identifier value and the second identifier value in a predetermined order.

In one embodiment, the predetermined order may include at least one of an ascending order or a descending order.

For example, in the ascending order, the first identifier value may be 1 and the second identifier value may be 2. In another example, in the descending order, the first identifier value may be 2 and the second identifier value may be 1.

In absence of the third identifier value as defined above, the second identifier value may be arranged adjacent to the first identifier value in the predetermined order. In other words, in the arrangement of the predetermined order, there are no other identifier values arranged between the first identifier value and the second identifier value. For example, in an arrangement of the predetermined order, the identifier values may be 2, 5, 19, and 50. If the second identifier value is arranged adjacent to the first identifier value in the ascending order, and if the second identifier value is 19, then the first identifier value may be 5 or 50.

In various embodiments, the identifier determination circuit 404 may be configured to determine a plurality of identifier values. The arranging circuit may be configured to arrange the plurality of identifier values in the predetermined order. The plurality of identifier values may include the first identifier value and the second identifier value which are not arranged at a start position of the predetermined order.

Using the above example illustrating the identifier values of 2, 5, 19, and 50, the first identifier value is not 2 and the second identifier value is also not 2, wherein the identifier value of 2 is at the start position of the predetermined order. For example, the first identifier value may be 5 and the second identifier value may be 19. In another example, the first identifier value may be 19 and the second identifier value may be 50.

In various embodiments, the plurality of identifier values may include a start identifier value which is arranged at the start position of the predetermined order, wherein the differential determination circuit 404 may be configured to determine a start differential value based on a difference between the start identifier value and a reference value.

Using the above example illustrating the identifier values of 2, 5, 19, and 50, the start identifier value is 2, which is at the start position of the predetermined order.

In one embodiment, the reference value may be a sum of two factors, wherein the first factor is a product of a page index value and a page length, and the second factor is a product of a block offset value and a block length. In other words, the reference value is a sum of a page index value x a page length and a block offset value x a block length. For example, the page length may be but is not limited to 2048. The block length may be but is not limited to 64.

The term "page index value" may refer to the value in the page index field which indicates the page currently assigned in a beacon. For example, the page index field may refer to the PageIndex 1118 of FIG. 11.

The term "block offset" may refer to the value in the block offset field. For example, assuming 32 blocks per page, these bits indicate the starting block index of an allocated group. For example, the block offset field may refer to the Block Offset 1112 of FIG. 11.

In one example, the access point may sort all AIDi, i=1, 2, . . . , n in an ascending order (AID1<AID2< . . . <AIDn) and then calculate the AID differential values according to:

$\Delta AID1 = AID1 - (PageIndex * 2048 + Block\ Offset * 64)$
$\Delta AIDi = AIDi - AIDi - 1, i=2, \ldots, n.$ In one embodiment, the block offset value may be a floor function of the start identifier value divided by the block length. For example, the block length may be but is not limited to 64.

In other words, for example, the ΔAID may be set to (AID−(PageIndex*2048+Block Offset*64)) where the offset value in the Block Offset field for the current ADE block by $\lfloor AID_1/64 \rfloor * 64$, where $\lfloor x \rfloor$, a floor function of x, refers to the largest integer that is not larger than x. 2048 and 64 are page length and block length respectively. It should be appreciated that different value may be used when the sizes of page or block takes different values. For example, to encode a list of paged AIDs, denoted as AID1, AID2 . . . AIDn, the access point (AP) may derive the offset value in the Block Offset field for the current ADE block. The paged AIDs refer to those AIDs with their corresponding bits being set to '1' if encoded by partial virtual bitmap.

Figure 9A:
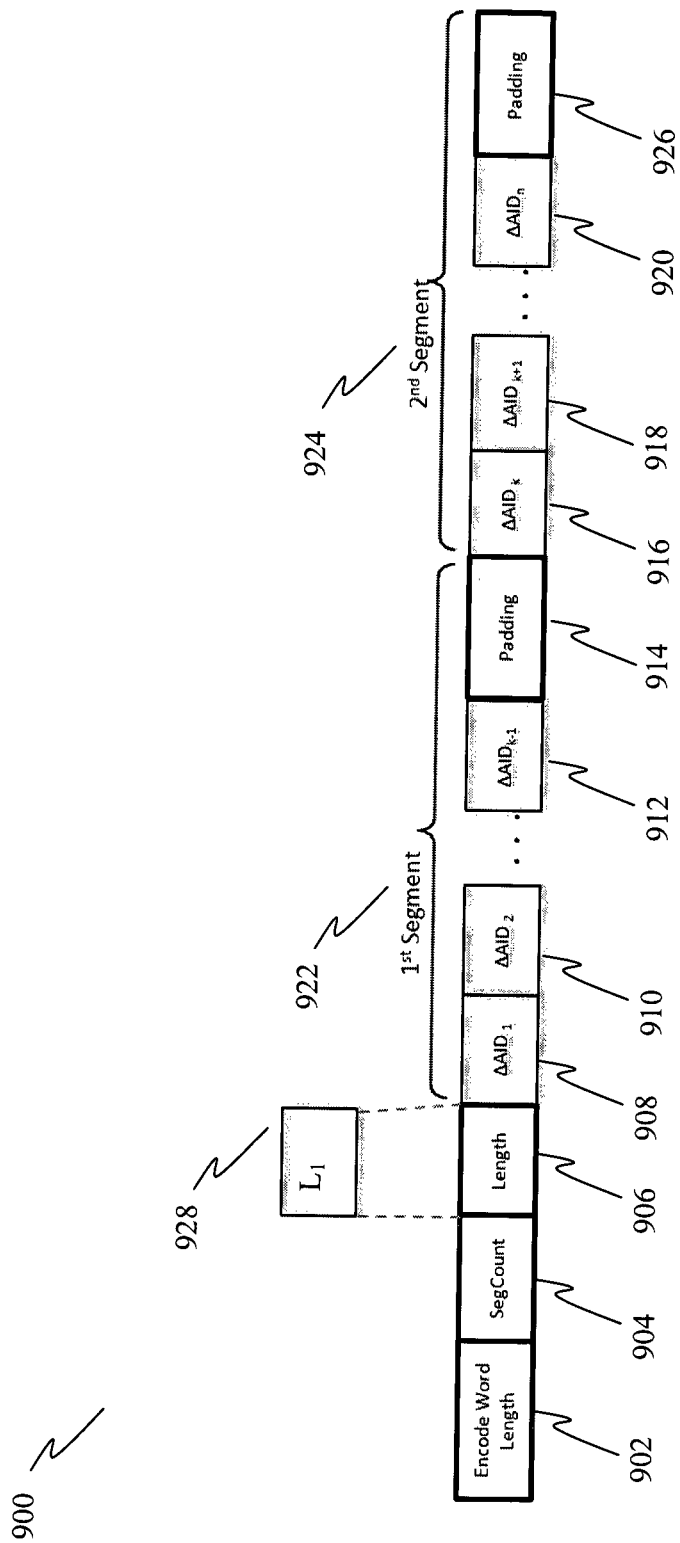
FIG. 9A shows an example of a field structure for segmented AID differential encoding, in accordance to various embodiments.

In various embodiments, the compression device 403 may further include a segmenting circuit configured to group the plurality of identifier values into a plurality of segments, wherein the differential determination circuit may be configured to determine, for each of the plurality of segments, a plurality of differential values for the identifier values grouped in the segment. FIG. 9A shows an example of two segments. The number of segments required may depend on the total number of identifier values to be grouped or may be fixed at a predetermined length, for example, 64 or 256 bits for each segment. For example, the plurality of differential values may be a part of n differential values (e.g. n AID differential values) where n may be the number of paged identifier values (e.g. AIDs) encoded in a block (e.g., AID differential encoding (ADE) block). The length of each differential value (i.e., ΔAID subfields) is denoted as WL which represents the encoded word length (the number of bits of each encoded words) of each identifier value (AID). All WL have the same length and the WL is indicated by the EWL field. For example, when the EWL field is 3 bits in length, the values of EWL field ranging from 0 to 7 represent, WL being 1 to 8 respectively.

In various embodiments, the compression device 402 may further include a grouping circuit configured to group the compressed string in a block. For example, the block may refer to the block shown in FIG. 12.

In various embodiments, the compression device 402 may further include a grouping circuit configured to group the compressed string in a page. For example, the page may refer to the page shown in FIG. 13.

In various embodiments, the compressed string generation circuit 408 may be configured to insert a padding bit into the compressed string. The padding bit is a additional bit, for example, to make up for the number of bits to form a byte. The padding bit may be a "0" bit. For the compressed string, there may be 0 to 7 padding bits contained in a padding field or subfield. The padding bits also indicate the end of a block (e.g., the current ADE block).

For example, the compression device 402 may be included in the access point.

Figure 4B:
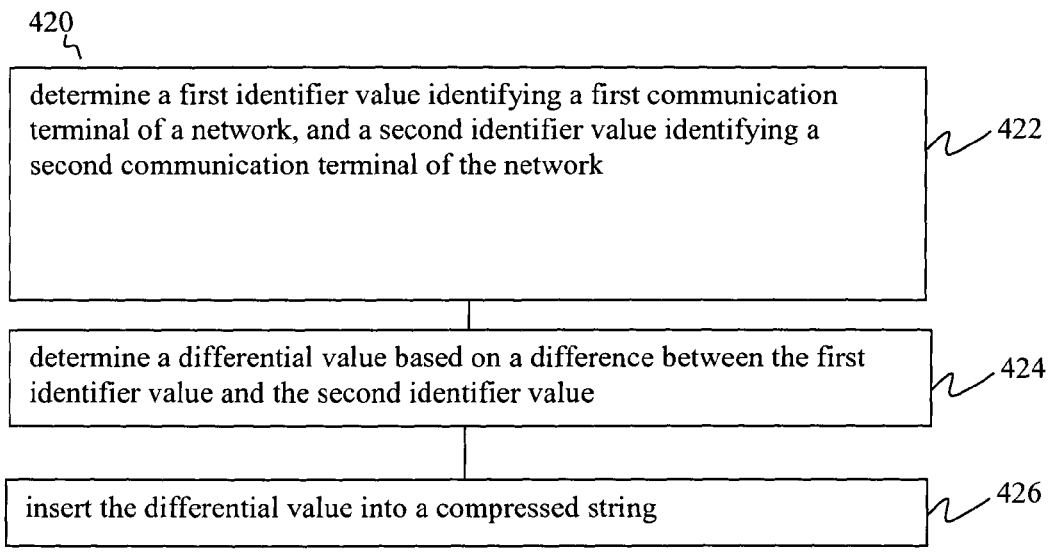
FIG. 4B shows a flow diagram of a compression method, in accordance to various embodiments.

FIG. 4B shows a flow diagram of a compression method 420, according to various embodiments. At 422, a first identifier value identifying a first communication terminal of a network, and a second identifier value identifying a second communication terminal of the network may be determined. At 424, a differential value based on a difference between the first identifier value and the second identifier value may be determined. At 426, the differential value may be inserted into a compressed string.

In other words, the compression method 420 performs the steps of computing the difference between two identifier values (or AIDs) and including this difference in a compressed string. As described above, the difference results in a smaller value as compared to at least the larger of the two identifier values, thereby requiring less number of bits to represent the difference as compared to the number of bits required to represent at least the larger of the two identifier values. With less number of bits included in the string, the string may reduce in size, thereby compressing the string.

The terms "determine", "difference", "compressed string", "insert" and "identifier value", "communication terminal", and "network" may be as defined above.

In various embodiments, for the first communication terminal data is present in an access point operating in the network; and wherein for the second communication terminal data is present in the access point.

The phrases "for the first communication terminal data is present in an access point" and "for the second communication terminal data is present in the access point" may be as defined above.

In various embodiments, the compression method 420 may further include inserting into the compressed string an encode word length (EWL) field indicating the number of bits required for representing the differential value. In one example, the size of the EWL field may be 3 bits.

In various embodiments, the compression method 420 may further include inserting into the compressed string a length field indicating the length of the compressed string excluding the encode word length (EWL) field and the length field. The length field may indicate the length of the compressed string in one or more octets. In one example, the size of the length field may be 5 bits.

The terms "EWL" and "length field" may be as defined above. As described above, for example, the EWL (e.g., the EWL 502 of FIG. 5A or the EWL 522 of FIG. 5B) may be appended to the differential value at the beginning of the compressed string. The length field (e.g., the length field 504 of FIG. 5A or the length field 534 of FIG. 5B) may be inserted between the EWL (e.g., the EWL 502 of FIG. 5A or the EWL 522 of FIG. 5B) and the differential value (e.g., $\Delta AID_1$ 506 of FIG. 5A or $\Delta AID_1$ 526 of FIG. 5B). An example of the compressed string may have a structure as shown in FIG. 5A or 5B.

In one embodiment, the compression method 420 may include determining a plurality of identifier values in a block; and inserting into the compressed string an encode word length field indicating that the number of bits required for representing the block is zero and a length field indicating that the length of the compressed string excluding the encode word length field and the length field is zero, if data is present in an access point operating in the network for each communication terminal of a plurality of communication terminals identified by the plurality of the identifier values.

In other words, for example, if all AIDs are paged, the compression method 420 may provide the compressed string consists of only the EWL and the length fields, where both the EWL and length fields are set to zero. As used herein, the term "paged" refers to the AIDs with their corresponding bits being set to '1' if encoded by partial virtual bitmap.

In one embodiment, the compression method 420 may include determining a plurality of identifier values in a block; and inserting into the compressed string an encode word length field with a value of 7, which may indicate that the number of bits required for representing the block is 8, a length field indicating that the length of the compressed string excluding the encode word length field and the length field is 1, and a sole differential value if data is not present in an access point operating in the network for one communication terminal of a plurality of communication terminals, wherein the one communication terminal is identified by one of the plurality of identifier values; and if data is present in the access point for the rest of the plurality of communication terminals identified by the rest of the plurality of identifier values. The sole differential value may be determined based on a difference between the one of the plurality of communication terminals and a sum of two factors, wherein the first factor is a product of a page index value and a page length, and the second factor is a product of a block offset value and a block length.

In other words, for example, if all but one AIDs are paged, the compression method 420 may provide the compressed string consists of only one differential value ($\Delta AID$ subfield or field). The EWL may be set to 7 and the length field may be set to one. The differential value in this embodiment may be (the one AID−(PageIndex*a page length+Block Offset*a block length). For example, the page length may be but is not limited to 2048. The block length may be but is not limited to 64.

In one embodiment, the compression method 420 may include determining a plurality of identifier values in a block; and inserting into the compressed string a single identifier value of the plurality of identifier values if data is present in an access point operating in the network for one communication terminal of a plurality of communication terminals, wherein the one communication terminal is identified by the single identifier value; and if data is not present in the access point for the rest of the plurality of communication terminals identified by the rest of the plurality of identifier values.

In various embodiments, determining the differential value at 424 may further include determining a differential value based on subtracting 1 from the difference between the first identifier value and the second identifier value.

The term "reducing" may be as defined above.

In various embodiments, the compression method 420 may further include performing encoding of the compressed string. In one embodiment, performing encoding of the compressed string may include performing encoding of the compressed string using Golomb coding. As described above, it should be understood and appreciated that other forms of encoding may also be applied.

In various embodiments, the compression method 420 may further include determining whether the number of bits of a predetermined state in the compressed string is larger than a predefined threshold.

The terms "predetermined state" and "predefined threshold" may be as defined above.

In one embodiment, the predetermined state may be "1". In another example, the predetermined state may be "0".

In various embodiments, the first identifier value may be a first association identity (AID) of the first communication terminal.

In various embodiments, the second identifier value may be a second association identity (AID) of the second communication terminal.

In various embodiments, the compression method 420 may further include determining a third identifier value identifying a third communication terminal of the network, wherein for the third communication terminal data is not present in the access point; determining an interpolated differential value based on at least one of a difference between the third identifier value and the first identifier value, or a difference between the third identifier value and the second identifier value; and inserting the interpolated differential value and the third identifier value into the compressed string.

In one embodiment, the compression method 420 may further include determining an interpolated differential value based on a difference between the first identifier value and second identifier value.

In one embodiment, the compression method 420 may further include determining a fourth identifier value identifying a fourth communication terminal of the network in addition to the third identifier value identifier as described above, wherein for the fourth communication terminal data is not present in the access point. In the embodiment, the compression method 420 may further include determining an interpolated differential value based on a difference between the third identifier value and the fourth identifier value. The compression method 420 may further include inserting the interpolated differential value, the third identifier value and the fourth identifier value into the compressed string.

The terms "interpolated differential value", "difference", "third identifier value" may be as defined above.

In various embodiments, the compression method may further include arranging the first identifier value and the second identifier value in a predetermined order. The predetermined order may include at least one of an ascending order or a descending order.

The terms "ascending order" and "descending order" may be defined in the above examples.

In various embodiments, the compression method 420 may further include determining a plurality of identifier values; and arranging the plurality of identifier values in the predetermined order, wherein the plurality of identifier values may include the first identifier value and the second identifier value which are not arranged at a start position of the predetermined order.

The plurality of identifier values may include a start identifier value which is arranged at the start position of the predetermined order, wherein the compression method may further include determining a start differential value based on a difference between the start identifier value and a reference value.

The terms "start position", "start differential value" and "reference value" may be as defined above.

In one embodiment, the reference value may be a sum of two factors, wherein the first factor is a product of a page index value and a page length, and the second factor is a product of a block offset value and a block length. In other words, the reference value may be a sum of a page index value x a page length and a block offset value x a block length. The block offset value may be a floor function of the start identifier value divided by the block length. For example, the page length may be but is not limited to 2048. The block length may be but is not limited to 64. In other words, for example, the ΔAID may be set to (AID−(PageIndex*2048+Block Offset*64)) where the offset value in the Block Offset field for the current ADE block by $\lfloor AID_1/64 \rfloor *64$, where $\lfloor x \rfloor$, a floor function of x, refers to the largest integer that is not larger than x. For example, to encode a list of paged AIDs, denoted as AID1, AID2 ... AIDn, the access point (AP) may derive the offset value in the Block Offset field for the current ADE block. The paged AIDs refer to those AIDs with their corresponding bits being set to '1' if encoded by partial virtual bitmap.

In various embodiments, the compression method 420 may further include grouping the plurality of identifier values into a plurality of segments, and determining, for each of the plurality of segments, a plurality of differential values for the identifier values grouped in the segment. For example, the plurality of differential values may be a part of n differential values (e.g. n AID differential values) where n may be the number of paged identifier values (e.g. AIDs) encoded in a block (e.g., AID differential encoding (ADE) block). The length of each differential value (i.e., ΔAID subfields) is denoted as WL which represents the encoded word length (the number of bits of each encoded words) of each identifier value (AID). All WL have the same length and the WL is indicated by the EWL field. For example, when the EWL field is 3 bits in length, the values of EWL field ranging from 0 to 7 represent, WL being 1 to 8 respectively.

In various embodiments, the compression method 420 may further include grouping the compressed string in a block.

In various embodiments, the compression method 420 may further include grouping the compressed string in a page.

In various embodiments, the compression method 420 may further include inserting a padding bit into the compressed string. For the compressed string, there may be 0 to 7 padding bits contained in a padding field or subfield. The padding bits also indicate the end of a block (e.g., the current ADE block).

The terms "segment", "block", "page" and "padding bit" may be as defined above.

For example, the compression method 420 may be performed by the access point.

Figure 4C:
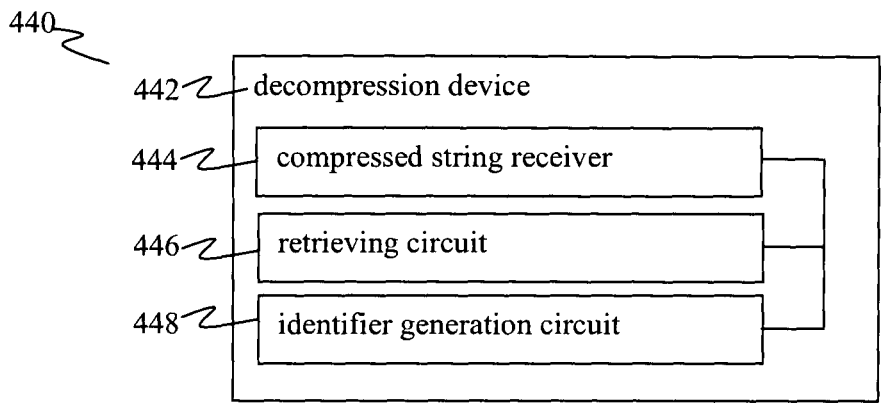
FIG. 4C shows a schematic diagram of a decompression device, in accordance to various embodiments.

FIG. 4C shows a schematic block diagram 440 of a decompression device 442, according to various embodiments. The decompression device 442 may include a compressed string receiver 444 configured to receive a compressed string including a differential value, wherein the differential value is based on a difference between a first identifier value identifying a first communication terminal of a network, and a second identifier value identifying a second communication terminal of the network; a retrieving circuit 446 configured to determine the differential value from the compressed string; and an identifier generating circuit 448 configured to determine the first identifier value and the second identifier value based on the differential value.

In other words, the decompression device 442 extracts the difference between two identifier values (or AIDs) from the compressed string. Together with a reference value, generally obtained from the compressed string, the two identifier values may be evaluated based on the difference. The decompression device 442 may perform the reverse functions of the compression device 402.

The terms "determine", "difference", "compressed string", "identifier value", "communication terminal", and "network" may be as defined above.

In various embodiments, for the first communication terminal data is present in an access point operating in the network; and wherein for the second communication terminal data is present in the access point.

The phrases "for the first communication terminal data is present in an access point" and "for the second communication terminal data is present in the access point" may be as defined above.

In various embodiments, the compressed string may further include an encode word length field (EWL) indicating the number of bits required for representing the differential value. In one example, the EWL field may be 3 bits in length.

In various embodiments, the compressed string may further include a length field indicating the length of the compressed string excluding the encode word length (EWL) field and the length field. The length field may indicate the length of the compressed string in one or more octets. In one example, the length field may be 5 bits in length.

The terms "EWL" and "length field" may be as defined above.

In one embodiment, the compressed string receiver 444 may further be configured to receive a compressed string including an encode word length field indicating that the number of bits required for representing a block is zero, and a length field indicating that the length of the compressed string excluding the encode word length field and the length field is zero; and the identifier generating circuit 448 may further be configured to determine a plurality of identifier values based on the encode word length field and the length field. With the determined plurality of identifier values, it may be concluded that data is present in an access point operating in the network for each communication terminal of a plurality of communication terminals identified by the plurality of the identifier values.

In other words, for example, if an inverse bit is 1, EWL and Length subfields or fields are zero, all AIDs are paged. The term "paged" may be as defined above.

In one embodiment, wherein the compressed string receiver 444 may further be configured to receive a compressed string including an encode word length field with a value of 7 indicating that the number of bits required for representing a block is 8, a length field indicating that the length of the compressed string excluding the encode word length field and the length field is 1, and a sole differential value; and the identifier generating circuit 448 may further be configured to determine a plurality of identifier values based on the encode word length field, the length field and the sole differential value, wherein the sole differential value may be based on a difference between the one of the plurality of communication terminals and a sum of two factors, wherein the first factor is a product of a page index value and a page length, and the second factor is a product of a block offset value and a block length. With the determined plurality of identifier values, it may be concluded that data is not present in an access point operating in the network for one communication terminal of a plurality of communication terminals, wherein the one communication terminal is identified by one of the plurality of identifier values; and data is present in the access point for the rest of the plurality of communication terminals identified by the rest of the plurality of identifier values. The terms "page length" and "block length" may be as defined above.

In other words, for example, if an inverse bit is 1, the EWL is 7 and the length subfield or field is 1, all AIDs except one are paged. The unpaged AID may be ΔAID+ PageIndex*the page length+Block Offset*the block length.

In various embodiments, the compressed string receiver 444 may further be configured to receive a compressed string including a single identifier value; and the identifier generating circuit 448 may further be configured to determine a plurality of identifier values based on the single identifier value. With the determined plurality of identifier values, it may be concluded that data is present in an access point operating in the network for one communication terminal of a plurality of communication terminals, wherein the one communication terminal is identified by the single identifier value; and data is not present in the access point for the rest of the plurality of communication terminals identified by the rest of the plurality of identifier values.

In various embodiments, the retrieving circuit 446 may be configured to add 1 to the differential value.

In various embodiments, the decompression device 442 may further include a decoding circuit configured to perform decoding of the compressed string if the compressed string has been encoded. For example, the compressed string has been encoded using Golomb coding.

In various embodiments, the decompression device 442 may further include a bit inversing circuit configured to inverse the compressed string.

As used herein, the term "inverse" may refer to inversing or changing a bit from "0" to "1", or from "1" to "0".

In various embodiments, the first identifier value may be a first association identity (AID) of the first communication terminal.

In various embodiments, the second identifier value may be a second association identity of the second communication terminal.

In various embodiments, the compressed string receiver 444 may further be configured to receive a compressed string including an encode word length field indicating the number of bits required for representing the differential value, a length field indicating the length of the compressed string excluding the encode word length field and the length field; and the decompression device 442 may further include a termination determining circuit configured to determine whether either the number of bits in the compressed string left for decompression is smaller than the encode word length field, or the differential value is zero.

In various embodiments, the termination determining circuit may further be configured to inform the retrieving circuit 446 and the identifier generating circuit 448 to terminate decompression if it is has been determined that either the number of bits in the compressed string left for decompression is smaller than the encode word length field, or the differential value is zero.

In one example, the decompression device 442 may stop the decoding when either one of following conditions is satisfied:
the number of bits left for decoding is less than WL;
ΔAIDi is zero and i>1.

In various embodiments, the decompression device 442 may be configured to determine whether the compressed string is a last block of a traffic indicator map information element; and the decompression device 442 may be configured to derive the number of identifier values based on block offset values in a block and block offset values in a subsequent block if it has been determined that the compressed string is not the last block.

In various embodiments, the decompression device 442 may be configured to determine whether the compressed string is a last block of a traffic indicator map information element; and the decompression device 442 may be configured to derive the number of identifier values an offset value and a page length field if it has been determined that the compressed string is the last block.

In one example, a station (STA) or communication terminal may derive the number of AIDs, including both paged and unpaged AIDS, encoded in one ADE block with following method:
If an ADE block is not the last encoded block in the TIM IE, the decoder can derive the number of AIDs encoded by this ADE block based on the block offset values in the current and the immediate next encoded blocks. For example, the offset values in the current ADE block and the next encoded block are Offset1 and Offset2. Then the AIDs encoded by this ADE block is [Offset1, Offset2), Offset1 is included and Offset2 is excluded.
If an ADE block is the last one in the TIM IE, the number of AIDs encoded by the last ADE block can be determined based on the offset value and page length or segment length if its TIM page is segmented.

The compressed string may further include a third identifier value identifying a third communication terminal of the network, wherein for the third communication terminal data is not present in the access point.

The compressed string may further include a fourth identifier value identifying a fourth communication terminal of the network, wherein for the fourth communication terminal data is not present in the access point.

The terms "third identifier value" and "fourth identifier value" may be as defined above.

In various embodiments, the compressed string may include a sequence of differential values. The identifier generating circuit 448 may be configured to determine a start identifier value, which is arranged at a start position of a plurality of identifier values arranged in a predetermined order, based on a sum of a differential value which is first in the sequence and a reference value. The plurality of identifier values may be identified with a plurality of communication terminals of the network. The start identifier value is the first identifier value. The start identifier value is not the second identifier value.

In various embodiments, the reference value may be a sum of two factors, wherein the first factor is a product of a page index value and a page length, and the second factor is a product of a block offset value and a block length. In other words, the reference value may be a sum of a page index value x a page length and a block offset value x a block length. The block offset value may be a floor function of the start identifier value divided by the block length. For example, the page length may be but is not limited to 2048. The block length may be but is not limited to 64. In other words, for example, the ΔAID may be set to (AID−(PageIndex*2048+Block Offset*64)) where the offset value in the Block Offset field for the current ADE block by $\lfloor AID_1/64 \rfloor *64$, where $\lfloor x \rfloor$, a floor function of x, refers to the largest integer that is not larger than x. For example, to encode a list of paged AIDs, denoted as AID1, AID2 . . . AIDn, the access point (AP) may derive the offset value in the Block Offset field for the current ADE block. The paged AIDs refer to those AIDs with their corresponding bits being set to '1' if encoded by partial virtual bitmap.

The terms "reference value", "page index value", "block offset value", "start identifier value", "start position", "predetermined order" may be as defined above.

In various embodiments, the compressed string may further include a segment count field indicating the number of segments in the compressed string; wherein the identifier generating circuit is configured to determine the identifier values grouped in the segment based on the segment count field.

In various embodiments, the compressed string has been grouped in a block.

In various embodiments, the compressed string has been grouped in a page.

In various embodiments, the compressed string may further include a padding bit. For the compressed string, there may be 0 to 7 padding bits contained in a padding field or subfield. The padding bits also indicate the end of a block (e.g., the current ADE block).

The terms "segment", "block", "page", and "padding bit" may be as defined above.

In various embodiments, the decompression device 442 may include a termination determining circuit configured to determine whether either the number of bits in the compressed string left for decompression is smaller than the encode word length field, or the differential value is zero. The termination determining circuit may further be configured to inform the retrieving circuit 446 and the identifier generating circuit 448 to terminate decompression if it has been determined that either the number of bits in the compressed string left for decompression is smaller than the encode word length field, or the differential value is zero.

For example, the encode word length may be represented by the length of each ΔAID subfields or fields (WL). The differential value may be ΔAIDi where i is more than 1.

In various embodiments, the decompression device 442 may be configured to determine whether the compressed string is a last block of a traffic indicator map information element (TIM IE). For example, the decompression device 442 may be configured to derive the number of identifier values based on block offset values in a block and a subsequent block if it has been determined that the compressed string is not the last block. For example, the block offset values in the block is Offset1 and the block offset values in the subsequent block is Offset2. Then, the identifier values encoded by the compressed string may be [Offset1, Offset2) wherein Offset1 is included and Offset2 is excluded.

In another example, the decompression device 442 may be configured to derive the number of identifier values based on an offset value and a page length or a segment length if a TIM page is segmented, if it has been determined that the compressed string is the last block.

For example, the decompression device 442 may be included in a communication terminal (e.g., a station).

Figure 4D:
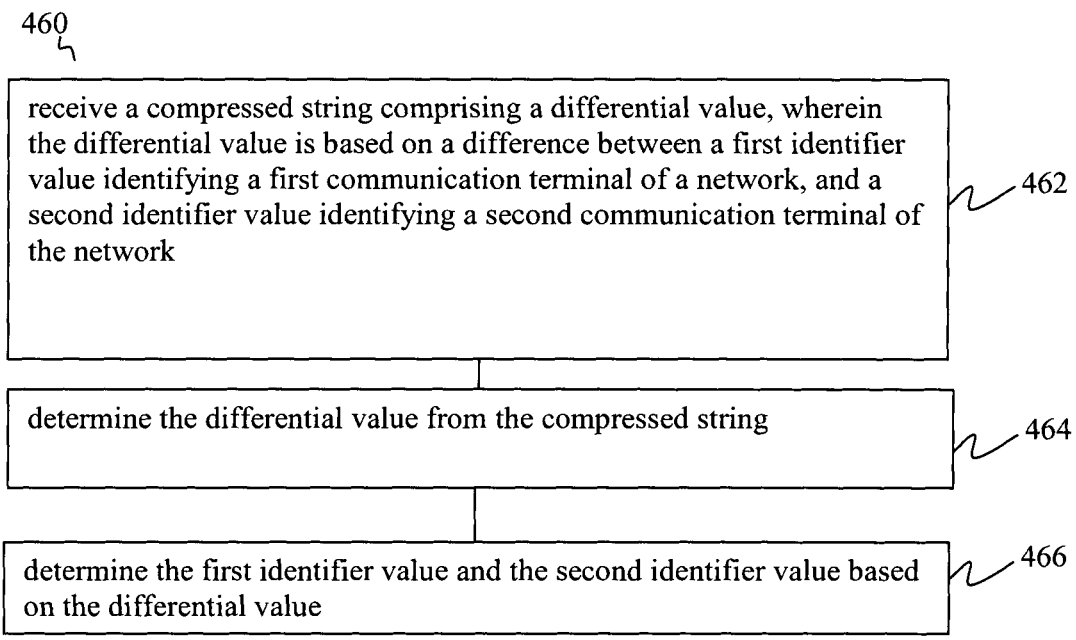
FIG. 4D shows a flow diagram of a decompression method, in accordance to various embodiments.

FIG. 4D shows a flow diagram of a decompression method 460 in accordance with various embodiments. At 462, a compressed string including a differential value, wherein the differential value is based on a difference between a first identifier value identifying a first communication terminal of a network, and a second identifier value identifying a second communication terminal of the network is received. At 464, the differential value is determined from the compressed string. At 466, the first identifier value and the second identifier value are determined based on the differential value.

In other words, the decompression method 460 performs the step of extracting the difference between two identifier values (or AIDs) from the compressed string. A reference value, generally obtained from the compressed string, may be used along with the difference to obtain the two identifier values. The decompression method 460 may perform the reverse steps of the compression method 420.

The terms "difference", "compressed string", "identifier value", "communication terminal", and "network" may be as defined above.

In one example, for the first communication terminal data is present in an access point operating in the network; and for the second communication terminal data is present in the access point.

The phrases "for the first communication terminal data is present in an access point" and "for the second communication terminal data is present in the access point" may be as defined above.

As described above, the compressed string may further include an encode word length (EWL) field indicating the number of bits required for representing the differential value. In one example, the EWL field may be 3 bits in length. The compressed string may further include a length field indicating the length of the compressed string excluding the encode word length (EWL) field and the length field. The length field may indicate the length of the compressed string in one or more octets. In one example, the length field may be 5 bits in length.

The terms "EWL" and "length field" may be as defined above.

In one embodiment, the decompression method 460 may include receiving a compressed string including an encode word length field indicating that the number of bits required for representing a block is zero, and a length field indicating that the length of the compressed string excluding the encode word length field and the length field is zero; and determining a plurality of identifier values based on the encode word length field and the length field. With the determined plurality of identifier values, it may be concluded that data is present in an access point operating in the network for each communication terminal of a plurality of communication terminals identified by the plurality of the identifier values.

In other words, for example, if an inverse bit is 1, EWL and Length subfields or fields are zero, the decompression method 460 may provide that all AIDs are paged. The term "paged" may be as defined above.

In one embodiment, the decompression method 460 may include receiving a compressed string including an encode word length field with a value of 7 indicating that the number of bits required for representing a block is 8, a length field indicating that the length of the compressed string excluding the encode word length field and the length field is 1, and a sole differential value; and determining a plurality of identifier values based on the encode word length field, the length field and the sole differential value, wherein the sole differential value is based on a difference between the one of the plurality of communication terminals and a sum of two factors, wherein the first factor is a product of a page index value and a page length, and the second factor is a product of a block offset value and a block length. With the determined plurality of identifier values, it may be concluded that data is not present in an access point operating in the network for one communication terminal of a plurality of communication terminals, wherein the one communication terminal is identified by one of the plurality of identifier values; and data is present in the access point for the rest of the plurality of communication terminals identified by the rest of the plurality of identifier values.

The terms "page length" and "block length" may be as defined above.

In other words, for example, if an inverse bit is 1, the EWL is 7 and the length subfield or field is 1, the decompression method 460 may provide that all AIDs except one are paged. The unpaged AID may be ΔAID+PageIndex*the page length+Block Offset*the block length.

In one embodiment, the decompression method 460 may include receiving a compressed string including a single identifier value; and determining a plurality of identifier values based on the single identifier value. With the determined plurality of identifier values, it may be concluded that data is present in an access point operating in the network for one communication terminal of a plurality of communication terminals, wherein the one communication terminal is identified by the single identifier value; and data is not present in the access point for the rest of the plurality of communication terminals identified by the rest of the plurality of identifier values.

In one example, the decompression method 460 may include receiving a compressed string including an encode word length field indicating the number of bits required for representing the differential value, a length field indicating the length of the compressed string excluding the encode word length field and the length field; and the decompression method 460 may further include determining whether either the number of bits in the compressed string left for decompression is smaller than the encode word length field, or the differential value is zero. The decompression method 460 may further include informing a termination of decompression if it is has been determined that either the number of bits in the compressed string left for decompression is smaller than the encode word length field, or the differential value is zero.

For example, the encode word length may be represented by the length of each ΔAID subfields or fields (WL). The differential value may be ΔAIDi where i is more than 1.

In one example, the decompression method 460 may include determining whether the compressed string is a last block of a traffic indicator map information element; and deriving the number of identifier values based on block offset values in a block and block offset values in a subsequent block if it has been determined that the compressed string is not the last block.

For example, the block offset values in the block is Offset1 and the block offset values in the subsequent block is Offset2. Then, the identifier values encoded by the compressed string may be (Offset1, Offset2) wherein Offset1 is included and Offset2 is excluded.

In another example, the decompression method 460 may include determining whether the compressed string is a last block of a traffic indicator map information element; and deriving the number of identifier values an offset value and a page length field if it has been determined that the compressed string is the last block.

In yet another example, the decompression method 460 may include deriving the number of identifier values based on an offset value and a page length or a segment length if a TIM page is segmented, if it has been determined that the compressed string is the last block.

The decompression method 460 may further include adding 1 to the differential value. The decompression method 460 may further include performing decoding of the compressed string if the compressed string has been encoded. For example, the compressed string has been encoded using Golomb coding.

The decompression method 460 may further include inversing the compressed string.

As described above, the first identifier value may be a first association identity of the first communication terminal. The second identifier value may be a second association identity of the second communication terminal. The compressed string may further include a third identifier value identifying a third communication terminal of the network, wherein for the third communication terminal data is not present in the access point. The compressed string may further include a fourth identifier value identifying a fourth communication terminal of the network, wherein for the fourth communication terminal data is not present in the access point.

The terms "third identifier value" and "fourth identifier value" may be as defined above.

In the decompression method 460, the compressed string may include a sequence of differential values. The decompression method 460 may further include determining a start identifier value, which is arranged at a start position of a plurality of identifier values arranged in a predetermined order, based on a sum of a differential value which is first in the sequence and a reference value. The plurality of identifier values may be identified with a plurality of communication terminals of the network. The start identifier value is not the first identifier value. The start identifier value is not the second identifier value.

The reference value is a sum of a page index value x a page length and a block offset value x a block length. The block offset value is a floor function of the start identifier value divided by the block length. For example, the page length may be but is not limited to 2048. The block length may be but is not limited to 64. In other words, for example, the ΔAID may be set to (AID−(PageIndex*2048+Block Offset*64)) where the offset value in the Block Offset field for the current ADE block by ⌊$AID_1$/64⌋*64, where ⌊x⌋, a floor function of x, refers to the largest integer that is not larger than x. For example, to encode a list of paged AIDs, denoted as AID1, AID2 . . . AIDn, the access point (AP) may derive the offset value in the Block Offset field for the current ADE block. The paged AIDs refer to those AIDs with their corresponding bits being set to '1' if encoded by partial virtual bitmap.

The terms "reference value", "page index value", "block offset value", "start identifier value", "start position", "predetermined order" may be as defined above.

In the decompression method 460, the compressed string may further include a segment count field indicating the number of segments in the compressed string. The decompression method 460 may further include determining the identifier values grouped in the segment based on the segment count field. In one example, the compressed string has been grouped in a block. In another example, the compressed string has been grouped in a page. The compressed string may further include a padding bit. For the compressed string, there may be 0 to 7 padding bits contained in a padding field or subfield. The padding bits also indicate the end of a block (e.g., the current ADE block).

The terms "segment", "block", "page", and "padding bit" may be as defined above.

For example, the decompression method 460 may be performed by a communication terminal (e.g., a station).

Various embodiments may provide an AP forming the TIM information through encoding or compressing the encoding results on the difference between two consecutive TIM bitmap or the difference between two TIM bitmaps where the referred TIM or TIM segments may be sent earlier or in the same information element of traffic indication map in full beacon/short beacon/broadcast TIM frames/control signals, for all or a group of STAs. Other new TIM bitmap parts may be transmitted without any differential encoding but with or without compression. The AP may need to provide the boundary (i.e., starting position and/or ending position or length in bytes/bit/bi-bytes) for different TIM parts with or without differential encoding, either explicitly or implicitly. Referred information may be sent out in full/short beacon/broadcast TIM frames/control signals with complete information. The AP may need control bits in TIM to indicate that the differential encoding method is used. For example, the ADE described herein may be an encoding method for the TIM bitmap specified in the IEEE 802.11-2012 standard.

The differential encoding method according to various embodiments may save up to a few hundred bytes for the referred TIM bitmap, thereby enabling low cost. When there are a lot of zeros ('0's) which means that there is no significant difference between two consecutive TIM bitmaps or TIM parts in the same information element of traffic indication map, it may be relatively easier to have the compression gain.

In one example a complete TIM bitmap (for all or a group of STAs) may be sent in a full beacon, while a short beacon may be transmitted with differential encoded TIM bitmap partially or fully, with a distinct boundary.

In one example, a full TIM bitmap may be sent in a compressed manner or the encoded format as in 802.11-2007/802.11v.

In one example, a full TIM bitmap may be grouped, and partial (incomplete) TIM bitmap may be sent in short beacon or other broadcast frames, where the partial TIM are differentially encoded if necessary for each group separately.

In one example, the AP may send out a full TIM bitmap according to its own decision or upon the request of one or more STAs. STAs that have not received a full TIM may have to wait for a full TIM in order to do power-save poll (PS-Poll).

Partial TIM may be helpful for a large number of STAs that are indicated in TIM bitmap. Short beacon may be transmitted in a shorter interval and may require a small size of TIM. Differential encoding with compression method for TIM bitmap is therefore efficient so it may meet the specification requirements.

If STAs listen to more TIM (full/short beacon, broadcast TIM frames or other control signals), the differential encoding may be carried out across multiple TIM bitmaps for different group of STAs or all the STAs with a clear reference point, for example, where the reference point may be set as one of the sequence numbers in the beacon.

In various embodiments, considering that the minimal differential value for AID is 1, the differential value may be further reduced by one. That is, instead of encoding $\Delta AID_i = AID_i - AID_{i-1}$, for i=1, 2, . . . , n, in the bitmap, the differential value $\Delta AID_i$ may be further reduced by 1 and encoded in the bitmap. Effectively, $\Delta AID_i - 1$ may be encoded into the bitmap. In these embodiments, the following is set: $AID_0 = 0$. The encoding method may be shown via simulation to further reduce the size of bitmap.

In various embodiments, other compression method such as Golomb coding may also be further applied on the derived series $\Delta AID_1 - 1, \Delta AID_2 - 1, \ldots, \Delta AID_n - 1$ to further reduce the size of bitmap.

In case multiple compression algorithms may be used for compression, an AP may compare the performance of different methods and choose one of them for use. The AP chooses the compression algorithm either based on compression ratio or based on complexity or both. The AP may indicate the compression algorithm used for TIM compression in the beacon and station may decompress the TIM bitmap accordingly.

When compressing the bitmap, the AP may also choose more than one compression methods together, for example, AID Differential Encoding and Golomb code, to compression the same bitmap. The AP may indicate all the compression algorithms that have been used in compressing the bitmap.

Details for AID differential encoding (ADE) may be described as follows:

Denote n AIDs in ascending order as $AID_1, AID_2, \ldots, AID_n$

Compress $AID_1, AID_2, \ldots, AID_n$ with differential encoding as follows:

$\Delta AID_1 = AID_1 - 1$, or $\Delta AID_1 = AID_1$ (or other reference value based on $AID_1$, e.g. $AID_1$−offset, where offset can be indicated in the TIM IE or through other manner)

$\Delta AID_i = AID_i - AID_{i-1} - 1$, i=2, . . . , n, or $\Delta AID_i = AID_i - AID_{i-1}$, i=2, . . . , n.

Concatenate the binary form of $\Delta AID_1$ 506, $\Delta AID_2$ 508, . . . , $\Delta AID_n$ 510 as shown in the exemplary structure 500 of FIG. 5A, with the fields:

Encode word length (EWL) 502: number of bits required to encode max($\Delta AID_i$), i=1, 2, . . . , n Length 504: the length of the block (in number of bytes)

The differential encoded AID sequence $\Delta AID_1$ 506, $\Delta AID_2$ 508, . . . , $\Delta AID_n$ 510

To decode the above encode AID bitmap, the decoder obtains the EWL 502 and the Length 504. It then retrieves $\Delta AID_1$ 506, $\Delta AID_2$ 508, ..., $\Delta AID_n$ 510 one by one, and then start to decode the differential encoded AID sequence to obtain AID sequence $AID_1$, $AID_2$, ..., $AID_n$ by $AID_1=\Delta AID_1+1$ (or by $AID_1=\Delta AID_1$ or $\Delta AID_1+$offset) and $AID_i=\Delta AID_i+AID_{i-1}+1$, i=2, ..., n (or $AID_1=\Delta AID_i+AID_{i-1}$, i=2, ..., n).

n AIDs for the sequence of $AID_1$, $AID_2$, ..., $AID_n$ may be the shifted AID values by one or some offset values, where the starting position of the AID sequence that uses a different offset value known through some manners. For example, in the TIM IE, the order in the sequence may be included to indicate the starting position of AID that uses each new offset value and the offset values may be also included.

In one example, the structure 500 may be referred to as the encoded block information field 520 (FIG. 5B) may include or may consist of the Encode word length (or may be interchangeably referred to as the Encoding Word Length) (EWL) subfield 522, Length subfield 524, n AID Differential Values ($\Delta AID$) subfields 526, 528 and padding subfield 530, where n is the number of paged AIDs encoded in the ADE block. The paged AIDs refer to those AIDs with their corresponding bits being set to '1' if encoded by partial virtual bitmap.

The length of each $\Delta AID$ subfields (WL) (e.g., for $\Delta AID1$ 526, ..., $\Delta AIDn$ 528) represents the encoded word length (the number of bits of each encoded words) of each AID. All WL may have the same length. WL may be indicated by EWL subfield 522. The EWL subfield 522 may be 3 bits in length with B0 being LSB. The values of EWL subfield 522 ranging from 0 to 7 may represent, WL being 1 to 8 respectively. The Length subfield 524 may be 5 bits in length with B3 being LSB and it may specify the total length of the current ADE block in octets, excluding EWL 522 and Length 524 subfields.

The padding subfield 530 may contain 0-7 padding bits. The padding bits may also indicate the end of the current ADE block.

To encode a list of paged AIDs, denoted as AID1, AID2 ... AIDn, an AP can derive the offset value in the Block Offset field for the current ADE block by $\lfloor AID_1/64 \rfloor*64$, where $\lfloor x \rfloor$, a floor function of x, refers to the largest integer that is not larger than x, and $AID_1$ is smallest AID in the list.

The encoding procedure may be as follows:
If all AIDs in the ADE blocks are paged, the AP sets the inverse bit to 1 and the ADE Block consists only EWL 522 and Length 524 fields, where both EWL 522 and Length 524 Field are set to zeros.

If all but one AIDs in the ADE blocks are paged, the AP sets the inverse bit to 1 and the ADE Block consists only one $\Delta AID$ subfield (e.g., $\Delta AID1$ 526). The AP sets EWL 522 to 7 and Length subfield 524 to one. The $\Delta AID$ subfield is set to (AID−(PageIndex*2048 (or page size)+Block Offset*64 (or block size))). The PageIndex is a value of the PageIndex field which is included in the bitmap control of the TIM IE and the Block Offset is a value of the Block Offset field which is included in the partial virtual bitmap of the TIM IE (e.g., FIG. 8A). The term "page size" may be interchangeably referred to as "page length" and the term "block size" may be interchangeably referred to as "block length".

If only one AID is paged in the ADE blocks, the AP may set the inverse bit to 0 and use single AID mode.

For all other cases, the AP sorts all AIDi, i=1, n in an ascending order (AID1<AID2< ... <AIDn) and then calculate the AID differential values according to:

$\Delta AID1=AID1-$(PageIndex*2048 (or page size)+Block Offset*64 (or block size)). The term "page size" may be interchangeably referred to as "page length" and the term "block size" may be interchangeably referred to as "block length".

$\Delta AIDi=AIDi-AID(i-1)$, i=2, ..., n.

Determine WL as the minimum bits can represent the largest $\Delta AIDi$ (or mathematically $\lfloor \log_2 MAX(\Delta AIDi) \rfloor +1$ where $MAX(\Delta AIDi)$ denotes the largest $\Delta AIDi$), i=1, 2, ..., n. The value of EWL subfield 522 is set to WL−1. For n AID differential values, totally WL*n bits are required. The number of bits may be less than or equal to 248 since maximum payload in an ADE block is 31×8=248. The total number of bits WL*n may not be a multiple of an octet. $\lceil WL*n/8 \rceil*8-WL*n$ zero bits shall be padded to make the ADE block end at octet boundary, where $\lceil x \rceil$ is a ceiling function of x. The ceiling function of x refers to the smallest integer not less than x.

When decoding, if inverse bit is 1, the EWL 522 and Length 524 subfield are zeros, all AIDs in the ADE blocks are paged.

If inverse bit is 1, EWL 522 is 7 and Length 524 subfield is 1, all AIDs except one in the ADE blocks are paged. The unpaged AID is $\Delta AID1+$Block Offset*64.

For other cases, STA extracts PageIndex and Block Offset, EWL 522 and Length 524 values from the respective fields. It derives WL by adding 1 to the value from EWL field. The paged AIDs are then derived with following formulas:

AID1=$\Delta AID1+$(PageIndex*2048 (or page size)+Block Offset*64 (or block size)). The term "page size" may be interchangeably referred to as "page length" and the term "block size" may be interchangeably referred to as "block length".

AIDi=$\Delta AIDi+AID(i-1)$, i=2, ..., n.

The decoder may stop the decoding when either one of following conditions is satisfied:
the number of bits left for decoding is less than WL; or $\Delta AIDi$ is zero and i>1.

STA may derive the number of AIDs, including both paged and unpaged AIDS, encoded in one ADE block with following method:
If an ADE block is not the last encoded block in the TIM IE, the decoder derives the number of AIDs encoded by this ADE block based on the block offset values in the current and the immediate next encoded blocks. For example, the offset values in the current ADE block and the next encoded block are Offset1 and Offset2. Then the AIDs encoded by this ADE block is [Offset1, Offset2], Offset1 is included and Offset2 is excluded.

If an ADE block is the last one in the TIM IE, the number of AIDs encoded by the last ADE block is determined based on the offset value and page length or segment length if its TIM page is segmented.

Average AID Distance (AAD) is defined as the average of the value difference between every two adjacent AIDs with TIM bit on in the bitmap. AAD is an important factor to determine which encoding method should be used. Intuitively, when AAD is large, it is more efficient to use ADE or direct AID; when AAD is small, it is more efficient to use block level encoding. Another factor that may be used is the variance of AID distance defined as the variance for the sequence of the value difference between every two adjacent AIDs with TIM bit on in the bitmap.

However, the performance of encoding efficiency for ADE may be degraded, if the value difference between two adjacent AIDs with TIM bit on in the bitmap becomes large and thus need more encoding bits to encode the differential value between two adjacent AIDs with TIM bit on. Due to this reason, some AIDs may be inserted into the AID sequence for differential encoding. However, these interpolated AIDs are not taken into account when the decoder decodes and recovers the AID bitmap, which means all the interpolated AIDs are with TIM bit off. This affects the final results of the decoding for the STAs when they receive the differential encoded AID with interpolation.

In the following examples, the ADE with Single Interpolation (ADE-SI) is described and this may be extended to a more general case of the ADE with Multiple Interpolations (ADE-MI). A variant of ADE-MI may be considered with simpler encoding/decoding but it may require saving the first AID in the bitmap block to be encoded.

When doing ADE for bitmap blocks, the encoder (for example, the compression device 400 of FIG. 4A) obtains the sequence of AID i.e. $AID_1, AID_2, \ldots, AID_n$ to get the number of bits required to encode $\max(\Delta AID_i)$, $i=1, 2, \ldots, n$. The following describes a method in accordance to various embodiments to improve ADE, with reference to the field structure 600 for ADE with Single Interpolation (ADE-SI) as shown in FIG. 6A:

I. The number of bits required may be reduced to encode $\max(\Delta AID_i)$, $i=1, 2, \ldots, n$ by inserting a new AID value $AID_v$ 606 into the sequence, where $AID_m < AID_v$ 606 $< AID_{m+1}$ and $m = \arg\max_i (\Delta AID_i)$ for $i=1, 2, \ldots n$. For example, if when $i=m$, $\max(\Delta AID_i)$ achieve the maximal value, then the encoder may insert $AID_v$ 606 into AID sequence to obtain a new AID sequence as $AID_1, AID_2, \ldots, AID_{m'}, AID_{m'+1}, AID_{m'+2} \ldots, AID_{n+1}$, where $AID_{m'} = AID_m$, $AID_{m'+1} = AID_v$ 606, $AID_{m'+2} = AID_{m+1}$.

II. For the above new AID sequence, using differential encoding so that the new differential AID sequence becomes $\Delta_{si}AID_i = AID_{i+1} - AID_i - 1$ for $i=1, \ldots, m'$, $\Delta_{si}AID_{m'} = 0$, and $\Delta_{si}AID_i = AID_{i+1} - AID_i - 1$ for $i=m'+2, \ldots, n+1$. Note that there is always a zero value in the new differential AID sequence i.e. $\Delta_{si}AID_i = 0$, where $i=m'+1$.

III. Concatenate the binary form of $\Delta_{si}AID_1$ 608, $\Delta_{si}AID_2$ (not shown in FIG. 6A), $\ldots, \Delta_{si}AID_{n+1}$ 610 with the fields:
   Encode word length (EWL) 602: number of bits required to encode $\max(\Delta_{si}AID_i)$, $i=1, 2, \ldots, n+1$;
   Length 604: the length of the block (in number of bytes);
   $AID_{si}$ is the inserted reference AID value (i.e., $AID_{si}$ may be $AID_v$ 606);
   The number of bits to represent $AID_{si}$ is fixed or known to both encoder and decoder (or may be referred to as the decompression device 440 of FIG. 4C); and
   The differential encoded AID sequence $\Delta_{si}AID_1$ 608, $\ldots, \Delta_{si}AID_{n+1}$ 610.

The ADE-SI decoder (for example, the decompression device 440 of FIG. 4C) first gets the EWL 602, Length 604 and $AID_v$ 606, and then start to decode $AID_i$ by $AID_{i+1} = AID_i + \Delta_{si}AID_i + 1$, $i=1, \ldots, n+1$. The EWL 602 and the Length 604 may be viewed as control fields. The original interpolated AID i.e. $AID_{m'+1}$ is not to be considered and is discarded (set as 0) in the final AID bitmap. The forward-decoded sequence for $i > m'+1$ starts from $i=m'+2$ with the AID reference value $AID_v$ 606 and the backward-decoded sequence for $i < m'+1$ starts from $i=m'$ with the AID reference value $AID_v$ 606. $AID_1 = \Delta_{si}AID_1 + 1$. Even if $\Delta_{si}AID_1 = 0$, the first $AID_1$ is not be considered as an interpolated value. That is, no interpolation is allowed before the first AID value in the AID sequence to be encoded with the ADE-SI.

Suppose one AID sequence: 2, 4, 34 is provided. Assume one interpolation ($AID_v = 20$) is inserted into the sequence that becomes 2, 4, 20, 34. The encoded $\Delta_{si}AID = 1, 1, 15, 13$ is based on $\Delta_{si}AID_i = AID_{i+1} - AID_i - 1$. Following the format of FIG. 6A, $AID_v = 20$, $\Delta_{si}AID_1 = 1$, $\Delta_{si}AID_2 = 1$, $\Delta_{si}AID_3 = 15$, $\Delta_{si}AID_4 = 13$.

If the station with AID=34 just wants to decode its TIM bit, it uses $AID_v = 20$ as the forward decoding reference and searches the encoded $\Delta_{si}AID_i$ for the zero value that is corresponding to $AID_v = 20$. Simply by $AID_{i+1} = \Delta_{si}AID_i + AID_i + 1$, it decodes $AID_4 = \Delta_{si}AID_3 + AID_3 + 1$, where $\Delta_{si}AID_4 = 13$ and $AID_3 = 20$ which is the $AID_v$. That is $AID_4 = 13 + 20 + 1 = 34$.

If the station with AID=4 just wants to decode its TIM bit, it uses $AID_v = 20$ as the backward decoding reference, and searches the encoded $\Delta_{si}AID_i$ for the zero value that is corresponding to $AID_v = 20$. Simply by $AID_i = AID_{i+1} - \Delta_{si}AID_i - 1$, it decodes $AID_2 = AID_3 - \Delta_{si}AID_2 - 1$, where $\Delta_{si}AID_2 = 15$ and $AID_3 = 20$. That is $AID_2 = 20 - 15 - 1 = 4$.

The method of ADE-SI may be extended to the case of inserting multiple AID values (or dummy AID values) for $AID_1, AID_2, \ldots, AID_m, AID_{m+1} \ldots, AID_n$, to obtain $AID_1, AID_2, \ldots, AID_k, AID_{v(1)}, AID_{k+1} \ldots, AID_m, AID_{v(2)}, AID_{m+1} \ldots, AID_n$ where $AID_{v(1)}$, and $AID_{v(2)}$ are the inserted dummy AIDs. More generally, $AID_{v(L)}$ may be the inserted dummy AID and the AID sequence may be denoted as $AID_1, \ldots, AID_{n+L}$. A method according to various embodiments may be ADE with Multiple Interpolations (ADE-MI) with reference to the frame structure 700 of FIG. 7A. The ADE-MI encoder (or may be referred to as the compression device 400 of FIG. 4A) obtains differential encoded AID sequence: $\Delta_{mi}AID_1$ 712 $= AID_1 - 1$ (or $\Delta_{mi}AID_1$ 712 $= AID_1$), $\Delta_{mi}AID_i = AID_{i+1} - AID_i - 1$, $i=2, \ldots, n+L$ (or $\Delta_{mi}AID_i = AID_{i+1} - AID_i$, $i=2, \ldots, n+L$). Concatenate the binary form of $\Delta_{mi}AID_1$ 712, $\ldots, \Delta_{mi}AID_{n+L}$ 714 with the fields:
   Encode word length (EWL) 702: number of bits required to encode $\max(\Delta_{mi}AID_i)$, $i=1, 2, \ldots, n+L$ (or $\max(\Delta_{mi}AID_i)$, $i=2, \ldots, n+L$ as shown in the aforementioned description);
   Length 704: the length of the block (in number of bytes);
   The number of bits to represent $AID_{v(i)}$, $i=1, \ldots, L$ is fixed or known to both encoder and decoder (or may be referred to as the decompression device 440 of FIG. 4C);
   $AID_{v(1)}$ 708, $\ldots, AID_{v(L)}$ 710 are the sequence of inserted (dummy) AIDs; and
   The differential encoded AID sequence $\Delta_{mi}AID_1$ 712, $\ldots, \Delta_{mi}AID_{n+L}$ 714.

It is noted that there are always L zero values in the new differential AID sequence i.e. $\Delta_{mi}AID_i = 0$, where $i=1, \ldots, n+L$. The zero bits for the differential-encoded AID value in the binary form indicates a new starting reference for the subsequent encoded values. The reference value in FIG. 7A is placed in front of the binary form and may be easily retrieved when the decoder receives the new differential AID sequence.

The ADE-MI decoder (for example, the decompression device 440 of FIG. 4C) first gets the EWL 702, Length 704 and number of the interpolations (NI) 706 so that it can retrieve all the L interpolated AID values: $AID_{v(1)}$ 708 $\ldots, AID_{v(L)}$ 710 and then starts to decode $AID_i$ by $AID_{i+1} = AID_i + \Delta_{mi}AID_i + 1$, $i=0, \ldots, n$ (or by $AID_{i+1} = AID_i + \Delta_{mi}AID_i$, $i=$ 0, ..., n, if the encoder chooses to encode such that $\Delta_{mi}AID_i=AID_{i+1}-AID_i$). It is noted that $\Delta_{mi}AID_O=0$. The original interpolated AIDs are not to be considered and are discarded (set as 0 with encoded bit length as indicated in the field of Length 704) in the final AID bitmap.

The backward-decoded sequence for $1<=i<k'+1$ starts from i=k' with the AID reference value $AID_{v(1)}$ 708, where k' is the position of the first interpolated new AID sequence (with smallest AID value among all the interpolated AID).

If k' is the position of the first interpolated new AID sequence (with smallest AID value among all the interpolated AID), the forward-decoded sequence for i>=k'+1 starts from i=k'+2 with the AID reference value $AID_{v(1)}$ 708.

Which interpolated AID is used to decode AID may be based on the position of the zero value that the decoder encounters in the differential encoded AID sequence $\Delta_{mi}AID_1$ 712, ..., $\Delta_{mi}AID_{n+L}$ 714.

The forward decoding is done for i>=m'+1 starts from i=m'+2 with the AID reference value $AID_{v(L)}$ 710 until i=n+L. $AID_{v(L)}$ 710 is the last interpolated new AID sequence (with largest AID value among all the interpolated AID).

$AID_{v(k)}$ may be used for forward decoding without starting from the beginning to speed up the decoding (e.g. using binary-tree search). Instead, the decoder just needs to search the zero values in the sequence of $\Delta_{mi}AID_i$, i=1, ..., n+L and uses the corresponding $AID_{v(k)}$ to do forward decoding. The field of $AID_{v(k)}$ and NI 706 may be removed, and are still able to decode. The details are provided below describing a further method in accordance with various embodiments to encode AID difference value by inserting new values with further improvement.

Suppose one AID sequence: 2, 4, 34, 60 is provided. Assume two interpolations ($AID_v$=20, 47) are inserted into the sequence that becomes 2, 4, 20, 34, 47, 60. The encoded $\Delta_{mi}AID$=1, 1, 15, 13, 12, 12 is based on $\Delta_{mi}AID_i=AID_{i+1}-AID_i-1$. Following the format of FIG. 7A, NI=2, $AID_{v(1)}$= 20, $AID_{v(2)}$=47, $\Delta_{mi}AID_1$=1, $\Delta_{mi}AID_2$=1, $\Delta_{mi}AID_3$=15, $\Delta_{mi}AID_4$=13, $\Delta_{mi}AID_5$=12, $\Delta_{mi}AID_6$=12.

If the station with AID=60 just wants to decode its TIM bit, it selects 47 (which is the closest value among all $AID_v$, which are 20, 47) as the forward decoding reference, which is $AID_{v(2)}$, so it searches the encoded $\Delta_{mi}AID_i$ for the second zero value that is corresponding to $AID_v$=47 Simply by $AID_{i+1}=\Delta_{mi}AID_i+AID_i+1$, it decodes $AID_6=\Delta_{mi}AID_5+AID_5+1$, where $\Delta_{mi}AID_5$=12 and $AID_5$=47 which is the second $AID_v$. That is $AID_6$=12+47+1=60.

If the station with AID=34 just want to decode its TIM bit, it selects 47 (which is the closest value to 60 among all $AID_v$, which are 20, 47) as the backward decoding reference, which is $AID_{v(2)}$, so it searches the encoded $\Delta_{mi}AID_i$ for the second zero value that is corresponding to $AID_{v(2)}$=47 Simply by $AID_i=AID_{i+1}-1$, it decodes $AID_4=AID_5-\Delta_{mi}AID_4-1$, where $\Delta_{mi}AID_4$=12 and $AID_5$=47 which is the second $AID_v$. That is $AID_4$=47−12−1=34.

Another variant or embodiment of ADE-MI is that first interpolated AID is $AID_1$ and it is a special interpolation that is different from other interpolations i.e. this AID value is to be considered into the final decoded AID bitmap. The field structure for ADE-MI variant 720 with the first TIM bit on AID as the first Interpolated AID is shown in FIG. 7B. Similar to FIG. 7A, the field structure 720 of FIG. 7B includes EWL 722, Length 724 and NI 728.

In this variant, if k is the position of last interpolated new AID sequence (with largest AID value among all the interpolated AID), the AID sequence may be forward-decoded without using backward decoding, i.e. for i=k+1 (k is how many times the decoder encounters zero value in the differential encoded AID sequence $\Delta_{mi}AID_1, ..., \Delta_{mi}AID_{n+L}$ 734) the decoder (for example, the decompression device 440 of FIG. 4C) starts from i=k+2 with the AID reference value $AID_{v(k+1)}$, to decode $AID_i$ by $AID_{i+1}=AID_i+\Delta_{mi}AID_i+1$, i=0, 1, ..., n+L (or by $AID_{i+1}=AID_i+\Delta_{mi}AID_i$, i=0, 1, ..., n+L). It is noted that $\Delta_{mi}AID_0$=0. In fact, since $AID_1$ is included in the interpolation list of $AID_{v(1)}$ 728, ..., $AID_{v(L)}$ 730, it is not required to be encoded in the differential encoding AID sequence $\Delta_{mi}AID_1, ..., \Delta_{mi}AID_{n+L}$ 734, which means that $\Delta_{mi}AID_1$ may be removed. The final differential encoding AID sequence is $\Delta_{mi}AID_2$ 732, ..., $\Delta_{mi}AID_{n+L}$ 734.

Suppose one AID sequence: 2, 4, 34, 60 is provided. Assume two interpolations (AID=20, 47) are inserted into the sequence that becomes 2, 4, 20, 34, 47, 60. The encoded $\Delta_{mi}AID$=1, 1, 15, 13, 12, 12 is based on $\Delta_{mi}AID_i=AID_{i+1}-AID_i-1$.

Following the format of FIG. 7B, NI=3, $AID_{v(1)}$=2, $AID_{v(2)}$=20, $AID_{v(3)}$=47, $\Delta_{mi}AID_1$=1, $\Delta_{mi}AID_2$=15, $\Delta_{mi}AID_3$=13, $\Delta_{mi}AID_4$=12, $\Delta_{mi}AID_5$=12.

If the station with AID=4 just wants to decode its TIM bit, it selects 2 (which is the closest value among all $AID_v$, which are 2, 20, 47) as the forward decoding reference, which is $AID_{v(2)}$, so it starts to decode based on the encoded $\Delta_{mi}AID_i$, simply by $AID_{i+1}=\Delta_{mi}AID_i+AID_i+1$, it decodes $AID_2=\Delta_{mi}AID_1+AID_1+1$, where $\Delta_{mi}AID_1$=1 and $AID_1=AID_{v(1)}$=2. That is $AID_2$=1+2+1=4.

If the station with AID=34 just want to decode its TIM bit, it selects 47 (which is the closest value to 60 among all $AID_v$, which are 2, 20, 47) as the backward decoding reference, which is $AID_{v(3)}$, so it searches the encoded $\Delta_{mi}AID_i$ for the second zero value that is corresponding to $AID_{v(3)}$=47, simply by $AID_i=AID_{i+1}-\Delta_{mi}AID_i-1$, it decodes $AID_4=AID_5-\Delta_{mi}AID_4-1$, where $\Delta_{mi}AID_4$=12 and $AID_5=AID_{v(2)}$=47. That is $AID_4$=47−12−1=34.

Another embodiment of ADE-MI is that Encode Word Length 722 is 1 and the field structure in FIG. 7B is reduced to the field structure in FIG. 5A. Due to Encode Word Length 722 is 1, $\Delta AID_1=AID_1$-a specified reference value and the value 0 for $\Delta AID_i$ (i>1) indicates the inserted dummy AID. The encoded block is similar to Partial Virtual Bitmap. In this case, the field of NI 726 in FIG. 7B is not needed.

An example of ADE with multiple interpolations where the difference between the neighboring interpolated values in ascending order is same may be provided. The encoding/decoding may be as described below. The encoding procedure may be that the interpolated AIDs are inserted into the AID sequence and differential encoding the AID sequence. When the encoder encounters the interpolated AID, it simply replace with a special reserved value (0). The approach is to select the right interpolated AID values into the AID sequence such that the overall length of compressed results/strings is minimized. For example, if AIDs are 1, 29, 31, 33, 35, 37, 39, and the starting reference is 0, the EWL (encoded word length) is $\log_2(29-1)$=5 bits and the total bit length for the differential encoded AIDs is 5*7=35 bits. Interpolated values (5, 9, 13, 17, 21, 25) may be inserted between 1 and 29 to generate a new AID sequence: 1, 5, 9, 13, 17, 21, 25, 29, 31, 33, 35, 37, 39. The results of the differential encode AIDs (including interpolated values) i.e. 1, 4, 4, 4, 4, 4, 2, 1, 1, 1, 1. It is clear that only 2 bits are needed to encode each value. The total bit length of encoded results is 2*12=24 bits. So in total 35−24=9 bits may be saved by using interpolated differential values. The final $\Delta AID$ values for the above sequence i.e. 1, 5, 9, 13, 17, 21, 25, 29, 31, 33, 35, 37, 39 may be presented as binary form: 01,00,00,00,00,00,00,00, 10,10,10,10,10, where the encoding sets all the interpolated different values to 00 of which there are in total 7 pairs. When decoder decompresses the encoded ΔAID values with interpolation (easily to determine whether it is ADE with interpolation from the reserved value 00 in the compressed results), it obtains EWL=2 bits and first decode AID=1 for the first AID value from first 2 bits which is 01, then decodes AID=1+2^EWL=5 for the second 2 bits which is 00, decodes AID=5+2^EWL=9 for the third 2 bits which is 00, . . . , decodes AID=25+2^EWL=29 for the $8^{th}$ 2 bits which is 00, decodes AID=29+2 for the $9^{th}$ 2 bits which is 10, and so on, decodes AID=37+2 for the $13^{th}$ 2 bits which is 10. In the decoding procedure, once encountering the special differential value 00, the decoder obtains AIDi+1=AIDi+2^EWL. FIG. 6A for ADE-SI and FIG. 7A and FIG. 7B for ADE-SI are more general form of the above example. For ADE-SI and ADE-MI, the differences between any two neighboring interpolated AID values are not necessarily the same.

It is possible to use some bits to indicate the options for different field structure, combining all the advantages of the above encoding methods based on AID differential encoding.

A further method in accordance to various embodiments to encode AID difference value by inserting new values with further improvement may be provided. Firstly, the AID difference value may be calculated as follows:

Denote n AIDs in ascending order as $AID_1, AID_2, \ldots, AID_n$

Compress $AID_1, AID_2, \ldots, AID_n$ with differential encoding as follows:
$\Delta AID_1 = AID_1$
$\Delta AID_i = AID_i - AID_{i-1}$, i=2, . . . , n.

In case maximal max($\Delta AID_i$) is much larger than the average distance, a few new AIDs may be inserted within in AID series $AID_1, AID_2, \ldots, AID_n$ to reduce the max($\Delta AID_i$) and make a new series $AID'_i$: $AID'_1, AID'_2$, i=1, 2, . . . m, m>n, $\Delta AID'_i$ is then recalculated. If $AID'_k$ is not an interpolated AID value and $AID'_{k+1}$ is an interpolated AID value, the encoder may choose the interpolated value $AID'_{k+1} = 2^{EWL} + AID'_k$, where ^ is the power operation (for example, 2^3=8).

Concatenate the binary form of $\Delta AID'_1, \Delta AID'_2, \ldots, \Delta AID'_m$ with the same structure shown in FIG. 5A, with the fields:

Encode word length (EWL): number of bits required to encode max($\Delta AID_i$), i=1, 2, . . . , m Length: the length of the block (in number of bytes)

The differential encoded AID sequence $\Delta AID'_1, \Delta AID'_2, \ldots, \Delta AID'_m$, for each inserted AIDs, assume it is $AID'_i$, a zero block follows $\Delta AID'_i$. Zero block here means a zero value encoded with EWL bits.

When a station decodes the bitmap, it ignores the $AID'_i$ if a zero block follows it, except that a zero block is the last block.

Figure 6B:
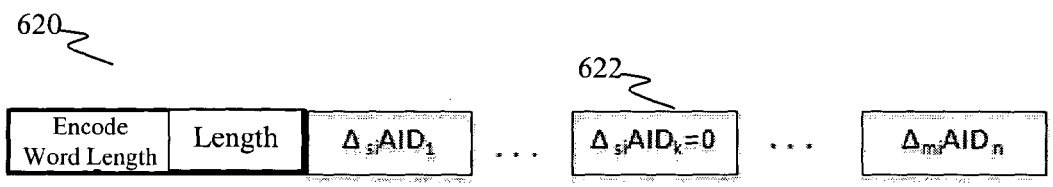
FIG. 6B shows another exemplary field structure for ADE with single interpolation, in accordance to various embodiments.
Figure 7C:
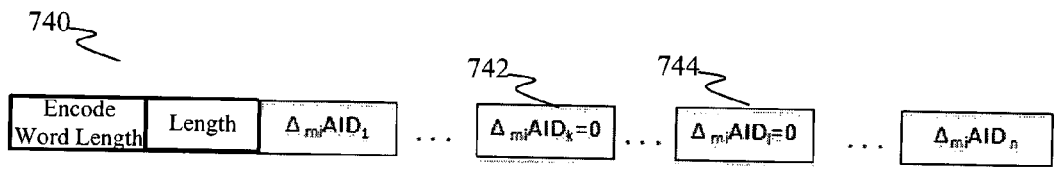
FIG. 7C shows an exemplary field structure for ADE with multiple interpolation, in accordance to various embodiments.

By using the above described further method in accordance to various embodiments to encode AID difference value by inserting new values with further improvement, the format for ADE with single interpolation 620 may be as shown in FIG. 6B and the format for ADE with multiple interpolation 740 may be as shown in FIG. 7C.

Figure 8A:
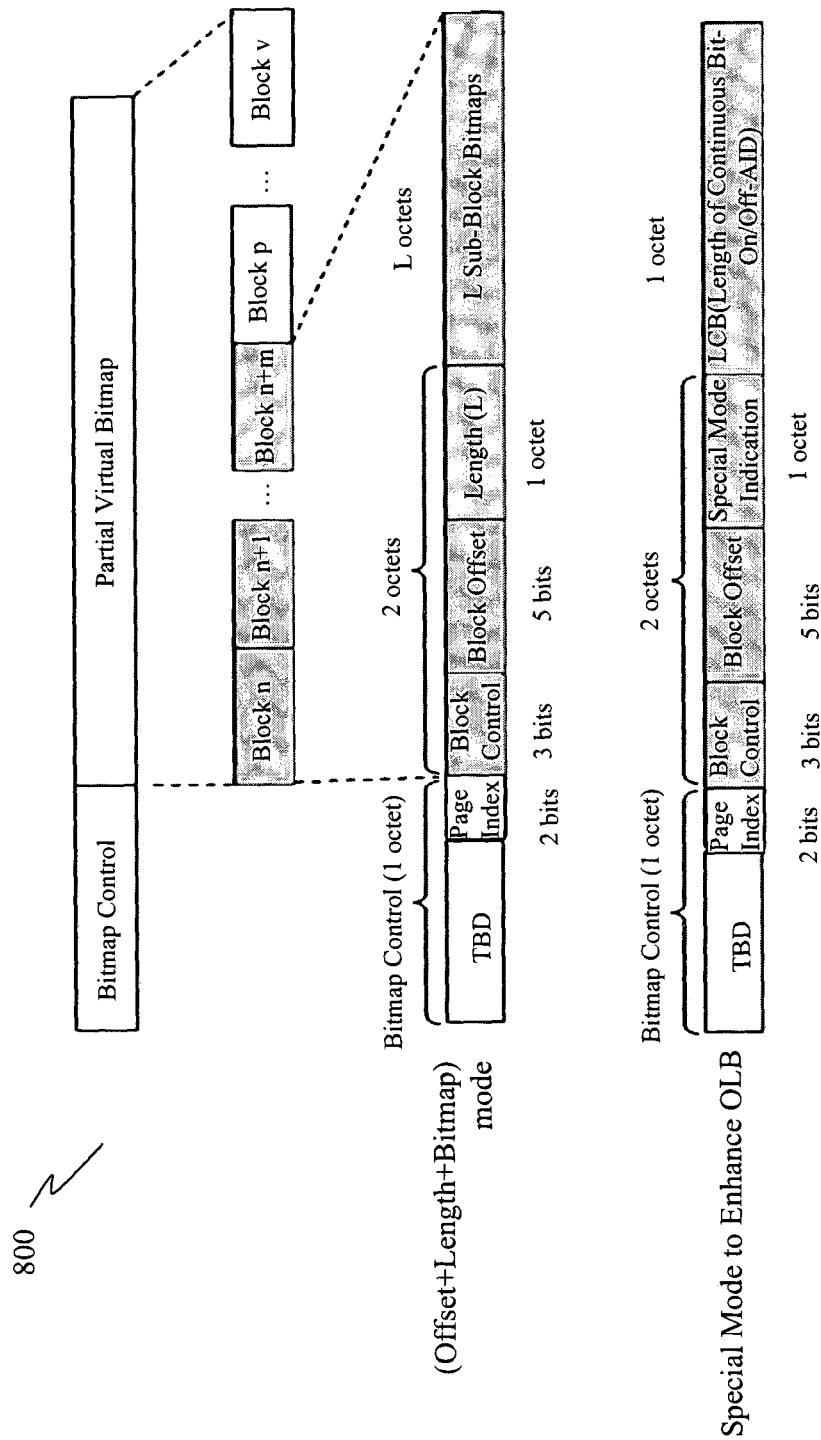
FIG. 8A shows an example of enhancement to Offset+Length+Bitmap (OLB) mode, in accordance to various embodiments.

Further enhancements for encoding continuous AID bitmap block with all bits set as 1 or 0 are as follows:

I. Extend the use of Offset+Length+Bitmap (OLB) mode as specified in the IEEE 802.11-1137-10-00ah-specification-framework-for-tgah, where Length field may be re-defined as Special Mode Indication, set as a special value (reserved case) such as 1 or 0 (which is invalid in OLB mode. It is noted that 0 to 8 are not used and such values may be reused and interpreted as the special mode to specify the case of encoding continuous AID bitmap block with all 1 's or all 0's that is at least one block long) and one more field LCB (Length of Continuous Bit-On/Off-AID) to indicate the number of bytes for the blocks that are all ones or zeros (which in fact may be inversed to all one using Inverse Mode). So the field for this mode includes Block Control, Offset, Length/Special Mode Indication and LCB. This preserves the OLB mode and provides an extension to enhance the encoding. The example of an enhancement to OLB mode 800 is shown in FIG. 8A. When the decoder decodes the bitmap, it identifies the special mode indication to decode the continuous AID bitmap block with all ones or zeros.

Figure 8B:
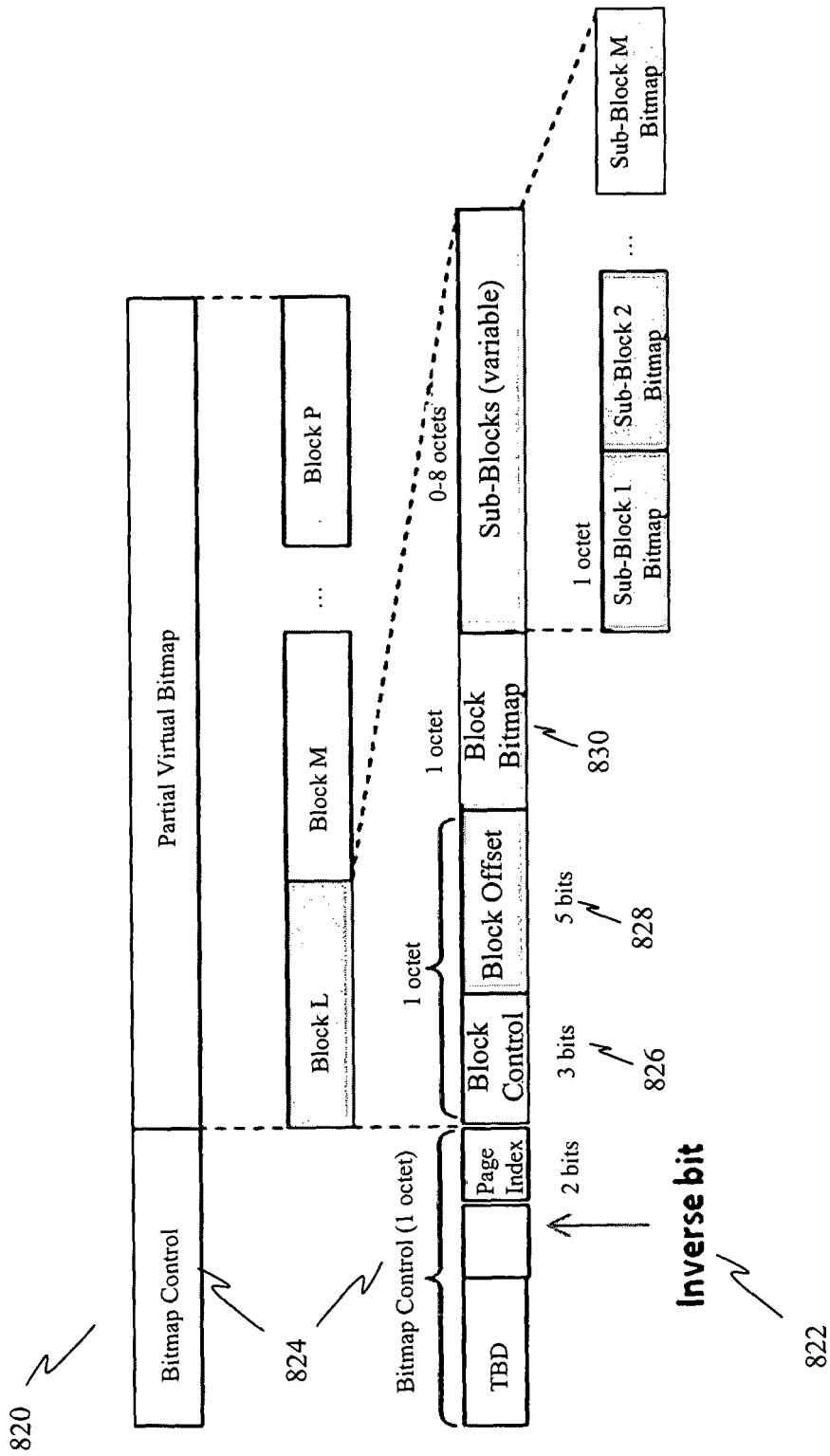
FIG. 8B shows an example of an inverse bit for TIM bitmap block, in accordance to various embodiments.

II. Reserve one bit (Inverse bit 822) in Bitmap Control field 824 as shown a TIM Bitmap Block 820 in FIG. 8B to facilitate the indication that the encoded TIM bitmap blocks with all bits set as one or most bits as one. The encoding method (for example, the compression method 420 of FIG. 4B) to indicate the abovementioned case with all bits (set as 1 or 0) requires 3 bytes i.e. block control 826, block offset 828 and block bitmap 830 (whose bits are all one), no matter whether inverse mode is used. This inverse bit is applied to the overall bitmap and different from the inverse mode only used in block level control. For example, If all bits in bitmap are one, set inverse bit as one. Since all bits in the bitmap after inverse is zero, it is not necessary to transmit the inversed bitmap. Therefore, the AP may not transmit the bitmap at all. The AP may also select to encode the inverse bitmap with all zero's with OLB (using block control, block offset and length).

If most bits are one, set inverse bit as one so that some blocks are all zero and they are not required to be present in the resulting bitmap.

When the decoder decodes the bitmap, it decodes the bitmap first by using the fields of block control 826, block offset 828 and block bitmap 830 if they are present, then apply bit-inversion over the whole bitmap.

Details of AID differential encoding (ADE) may be described hereinabove with reference to FIG. 5A. Another possible field structure for AID differential encoding is the same as shown in FIG. 5A but the Encode word length (EWL) 502 may be defined as the number of bits required to encode max($\Delta AID_i$), i=2, . . . , n, and $\Delta AID_1$ 506 may be encoded with a fixed length implicitly known or explicitly indicated in TIM IE or through other manners (association procedure or beacon frame). This is useful when the required number of bits to encode the differential values other than $\Delta AID_1$ 506 is smaller than the number of bits to encode $\Delta AID_1$ 506.

However, the performance of encoding efficiency for ADE may be degraded, if the value difference between two adjacent AIDs with TIM bit on in the bitmap becomes large and thus need more encoding bits to encode the differential value between two adjacent AIDs with TIM bit on. Due to this reason, the sequence of $\Delta AID_1, \Delta AID_2, \ldots, \Delta AID_n$ may be into a few segments such that each segment may achieve a smaller number of encoding bits that are required to encode the differential encoded values in all the segments.

FIG. 9A shows one example for the embodiment of the field structure 900 for segmented AID differential encoding, where Encode word length (EWL) 902: number of bits required to encode maximum differential-encoded value ($\Delta AID_i$) for all the segments;

SegCount 904: number of segments;

Length 906: the length of concatenated differentially encoded bits for the segment (in number of bytes). Generally, the Length may include $L_1, L_2, \ldots, L_M$ which are the length of the $1^{st}, 2^{nd}, \ldots$, M-th segment if there are (M+1) segments that may be represented in bits or bytes. The Length excludes the length of the last segment as the last segment length may be inferred from the Encode Word Length field, $L_1, L_2, \ldots$, and $L_M$. In the example of FIG. 9A, since only two segments are included, to Length 906 includes only one length value $L_1$ 928. The bit length of the $L_i$ is fixed and same for i=1, . . . , M. For example, $L_i$ may be 8 bits;

For $1^{st}$ segment 922, $\Delta AID_1$ 908 (fixed length or same size as $\Delta AID_i$, i>1): first AID value as the reference for differential encoding in the $1^{st}$ segment $\Delta AID_2$ 910 . . . $\Delta AID_{k-1}$ 912: concatenated binary form of differential encoded AID values For $2^{nd}$ segment 924, $\Delta AID_k$ 916: first AID value as the reference for differential encoding in the $2^{nd}$ segment $\Delta AID_{k+1}$ 918 . . . $\Delta AID_n$ 920: concatenated binary form of differential encoded AID values Padding: If the length values $L_1, L_2, \ldots, L_M$ are in the number of bits, Padding is not required for all the segment except last one. If the length values $L_1, L_2, \ldots, L_M$ are in the number of bytes, Padding is required for each segment. For example, some padding bits 914, 926 may be added to the end of the encoded segments so that the size is round up to multiple octets.

There may be some padding bits between two segments (due to the bit-alignment of the segment of encoded values to 8-bit if Length 906 is in number of bytes. If Length 906 is in number of bits, no padding bits are required). These inter-segment padding bits are not shown in FIG. 9A. For each segment, the starting differential-encoded value is AID value, which is the reference for the following encoded values.

For example, in FIG. 9A, there are two segments ($1^{st}$ segment 922 and $2^{nd}$ segment 924) so SegCount 904=2. For $1^{st}$ segment 922, $\Delta AID_1$ 908=$AID_1$ or $AID_1$-offset, $\Delta AID_i=AID_i-AID_{i-1}$, where i=2, . . . , k-1 (i.e., $\Delta AID_2$ 910, $\Delta AID_{k-2}$ 912) and offset may be known through TIM IE or other manner; for $2^{nd}$ segment 924, $\Delta AID_k$ 914=$AID_k$ or $AID_k$-offset, $\Delta AID_i=AID_i-AID_{i-1}$, where i=k+1, . . . , n (i.e., $\Delta AID_{k+1}$ 916, $\Delta AID_n$ 918). When the encoded block based on segmented ADE is a part of the whole encoded bitmap. The starting reference value for the segment may be some offset value, e.g. $\Delta AID_1=AID_1$-offset, where offset value is implicitly or explicitly indicated in the encoded bitmap. For example, if the AID values of $1^{st}$ segment 922 starts from 512 to 768, offset values may be 512. If $AID_1$=525, $\Delta AID_1$ 908=13.

Figure 9B:
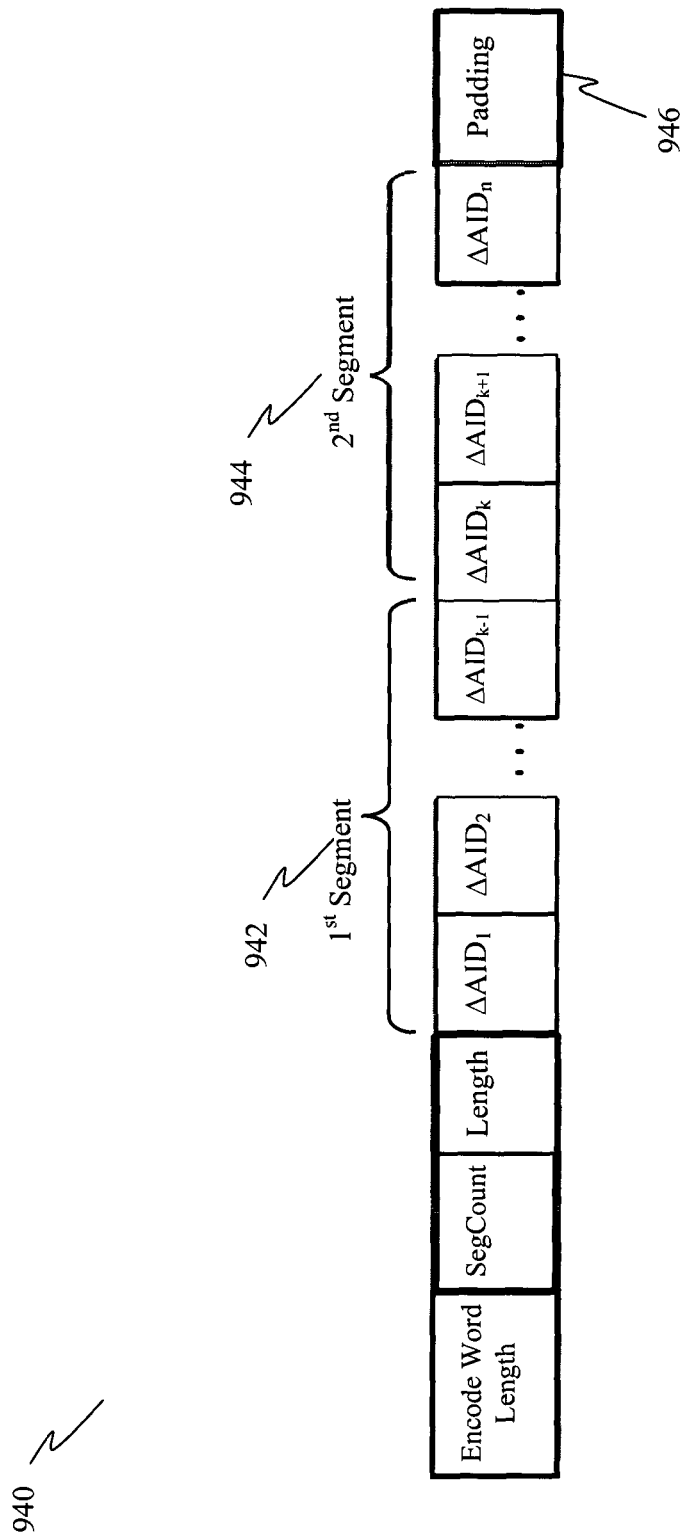
FIG. 9B shows another example of a field structure for segmented AID differential encoding, in accordance to various embodiments.

In another example 940 as shown in FIG. 9B, there are two segments ($1^{st}$ segment 942 and $2^{nd}$ segment 944). In the $1^{st}$ segment 942, there are no padding bits and in the $2^{nd}$ segment 944, padding bits 946 may be provided.

Once the decoder (for example, the decompression device 440 of FIG. 4C) starts the decoding, it obtains the Encode Word Length 902 as the number of bits required to encode differential-encoded values for all the segments and SegCount 904 as the number of segment included in the encoded bitmap. It uses Encode Word Length 902 and Length 906 to get the encoded value ($\Delta AID_i$). Once it finishes the decoding on one segment (e.g., $1^{st}$ segment 922), it proceeds to next segment (e.g., $2^{nd}$ segment 924) for decoding and may skip padding bits (if any). The decoder stops if it obtains all the segments with total number as SegCount 904.

This segmented AID differential encoded block may be used as block level encoding. It may be used as the encoding approach for page level encoding.

In IEEE 802.11-1137-11-00ah-specification-framework-for-tgah, Partial Virtual Bitmap is encoded in Block level:

Partial virtual bitmap includes or consists of one or more encoded Blocks of a single Page;

Block encoding:

Block Control(3 bits)+Block Offset (5 bits)+Block Bitmap (1 octet)+Sub-Block Bitmaps (0-8 octets)

Block Control field: controls how the Block Bitmap and the Sub-Block Bitmap fields are used Block bitmap encoding Single AID Offset+Length+Bitmap (OLB)

AID with Differential Encoding (ADE)

Inverse bitmap

Figure 10:
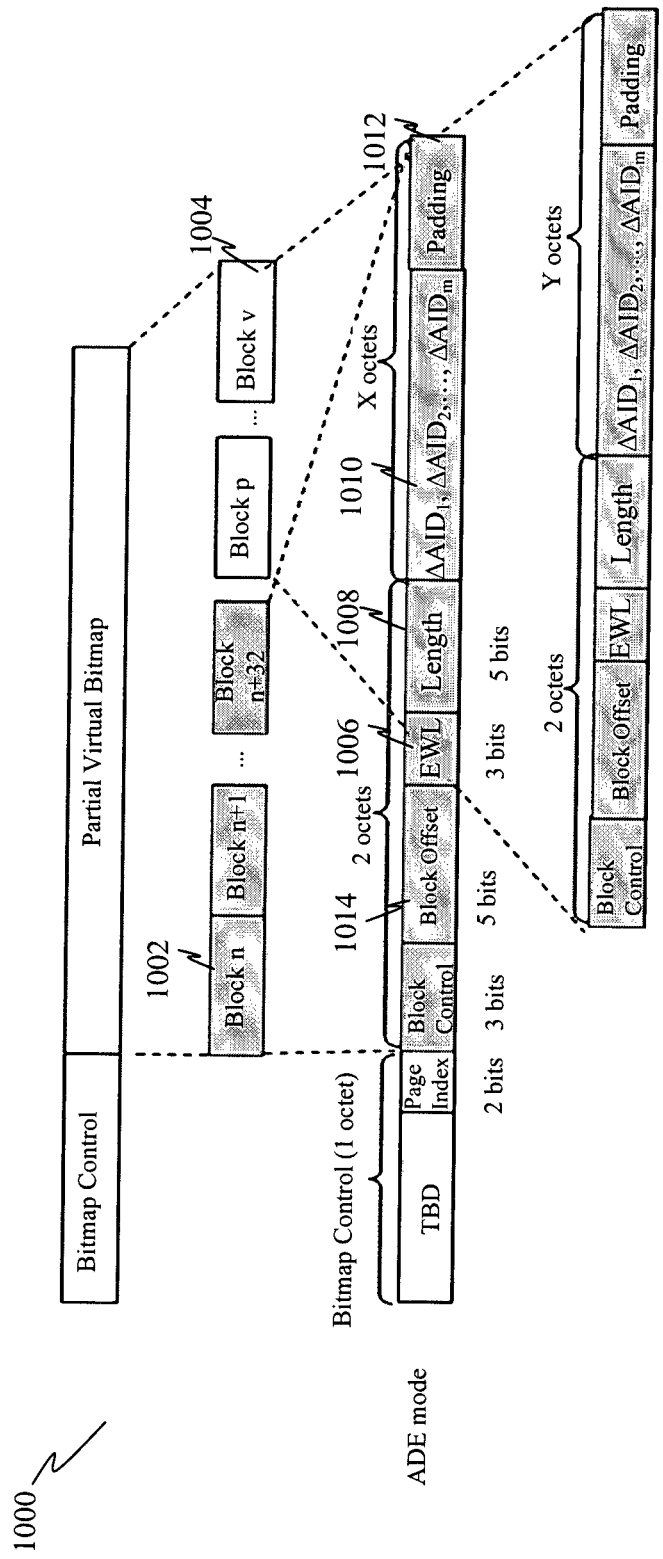
FIG. 10 shows an example of ADE under the hierarchical structure of IEEE 802.11-1137-11-00ah-specification-framework-for-tgah, in accordance to various embodiments.

As described herein, AID with Differential Encoding (ADE) may be included to support AID differential encoding, with the details as follows with reference to FIG. 10 depicting an embodiment for ADE under the hierarchical structure 1000 of the IEEE 802.11-1137-11-00ah-specification-framework-for-tgah:

Each block 1002 encodes up to 256 consecutive AIDs.

Last block 1004 may be shorter.

The Block Bitmap field includes or consists of following fields:

Encoded Word Length (EWL) 1006 (3 bits): number of bits required to encode differential AID value.

Length 1008 (5 bits): the length of encoded block bitmap, in number of octets Concatenated bits of differential encoded AID values of paged STAs: $\Delta AID_1, \Delta AID_2, \ldots, \Delta AID_m$ 1010

$\Delta AID_1 = AID_1 -$ Block Offset*block Size−pageIndex*page size, where for example, block size (or interchangeably referred to as block length) may be 64 and page size (or interchangeably referred to as page length) may be 2048.

$\Delta AID_i=AID_i-AID_{i-1}$, i=2, . . . , m.

Padding(0-7 bits) 1012: padding the encoded block to the boundary of octets

When STA receives TIM IE, if the block control field indicates that a bitmap block is encoded with ADE mode, it may use following steps to decode the TIM bitmap:

Obtain the Block Offset value 1014;

Obtain the values of $\Delta AID_1, \Delta AID_2, \ldots, \Delta AID_n$ from the encoded octets based on the information from EWL 1006 and length field 1008.

Decode $AID_i$ by:

$AID_1$=pageIndex*page size+Block Offset*block size+$\Delta AID_1$, where for example, block size (or interchangeably referred to as block length) may be 64 and page size (or interchangeably referred to as page length) may be 2048.

$AID_i=AID_{i-1}+\Delta AID_i$ for i=2, . . . , n

If inverse mode is used, when Encode Word Length 1006 is set to 0, the field of Length 1008 may be either set to the number of bits whose value is 1, $\Delta AID_1=AID_1$−Block Offset*block size (e.g., 64) where $AID_1$ is the first AID with TIM bit value 1 in this encoded block and there is no field of concatenated binary form of $\Delta AID_2, \ldots, \Delta AID_m$.

Therefore, the decoder decodes the encoded block as m-bit bitmap with all 1's and its starting AID=Block Offset*8+ $\Delta AID_1$.

If inverse mode is used, when Encode Word Length 1006 is set to 0, the field of Length 1008 may be either set to zero if the length of block is a known value between the encoder and the decoder. Therefore, when inverse bit is set to one, and the Encode Word Length 1006 is set to zero and the length field 1008 is set to zero, the decoder decodes the encoded block into a bitmap block of the known length with all bits set into 1's.

Figure 11:
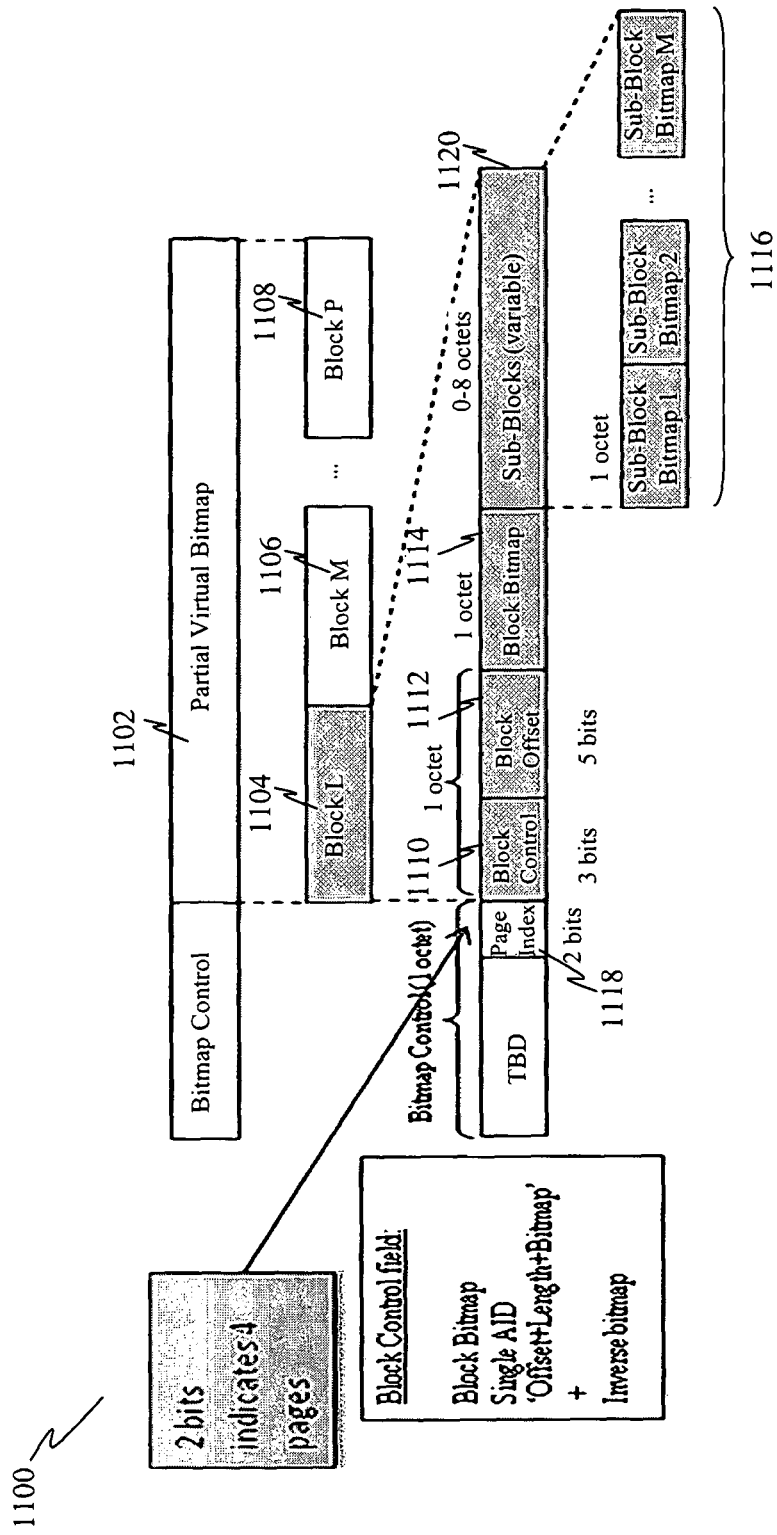
FIG. 11 shows an example of block level encoding.

In multipage TIM encoding, hierarchy-OLB encoding method specified in the IEEE 802.11ah framework is based per page TIM encoding (IEEE 802.11-1137-11-00ah-specification-framework-for-tgah). FIG. 11 shows an example of block level encoding 1100.

Partial Virtual Bitmap 1102 is encoded in Block level. Partial virtual bitmap 1102 includes or consists of one or more encoded Blocks (e.g., Block L 1104, Block M 1106, Block P 1108) of a single Page. Block encoding includes or consists of Block Control 1110 (3 bits), Block Offset 1112 (5 bits), Block Bitmap 1114 (1 octet) and Sub-Block Bitmaps 1116 (0-8 octets). Block Control field 1110: controls how the Block Bitmap 1114 and the Sub-Block Bitmap fields 1116 are used. Block bitmap encoding for AID includes Page Index 1118 (2 bits), Block Offset 1112 (5 bits), n (3 bits), m (3 bits), where n and m are as shown in FIG. 11. The n-th bit position of the Block Bitmap 1114 indicates whether the n-th Sub-Block Bitmap is present in the Sub-Block field 1120 and the m-th bit position of the Sub-Block Bitmap indicates whether the m-th STA has data buffered at the AP.

Single AID mode for AID is Page Index 1118 (2 bits), Block Offset 1112 (5 bits) and Block Bitmap 1114 [n:m]= [5:0] where n and m are as shown in FIG. 11. When there is a single AID in a Block, 6 bits of the Block Bitmap field 1114 is used to indicate the 6 LSBs of the AID and the Sub-Block field 1120 is not present. Inverse bitmap mode is activated, if there are many is in the bitmap of a Block, to inverse the bitmap and encode the inversed bitmap, which may be expected for many cases where the STAs sleep for a long period of time.

There may be many cases that STAs with different page index may have downlink buffered data at the AP to be delivered in one beacon interval. Current specification draft only allows for encoding TIM bitmap with the multiple pages into a few TIM IEs, which is not efficient. There are totally 4 pages that can support up to 8192 STAs but only 6000 STAs are required. Multipage AID differential encoding may be included for TIM bitmap compression.

In Multipage Mode Indication, page index may be redefined with the value b11 as the indication for the mode of Multipage TIM Encoding (simply Multipage Mode). The page index with the value b00, b01, b10 can support 6144 STAs. Block level encoding may not be applicable to Multipage Mode for multipage TIM encoding. AID Differential Encoding (ADE) or AID Differential Encoding with single or multiple interpolations (ADE-SI/ADE-MI) may be used. Upon decoding the multipage mode indication bits/field, the STA follows the corresponding TIM decoding procedure to obtain TIM bit/bitmap.

As discussed hereinabove, AID with Differential Encoding (ADE) according to various embodiments may be detailed as follows (for example, FIG. 5A):

Denote n AIDs in ascending order as $AID_1$, $AID_2$, ..., $AID_n$

Compress $AID_1$, $AID_2$, ..., $AID_n$ with differential encoding as follows:

$\Delta AID_1 = AID_1 - 1$ (or $\Delta AID_1 = AID_1$ or $\Delta AID_1 = AID_1 -$ reference value, for example, reference value=block offset*block size (or 64)+page index*page size (or 2048).

$\Delta AID_i = AID_i - AID_{i-1} - 1$, i=2, ..., n.

Concatenate the binary form of $\Delta AID_1$, $\Delta AID_2$, ..., $\Delta AID_n$ as the structure shown below, with the fields:

Encode word length (EWL): number of bits required to encode max($\Delta AID_i$), i=1, 2, ..., n)

Length: the length of the block (in number of bytes).

In the following examples (embodiments), Multipage Block Index is used to indicate the index of the block that is encoded and Page Offset is the page index. If Block Control field is 3-bit long and block size is 256, then max index value is 32. If Block Control field is 2-bit long and block size is 128, max index value is 64. Partial virtual bitmap includes or consists of one or more encoded Blocks of multiple Pages.

Figure 12A:
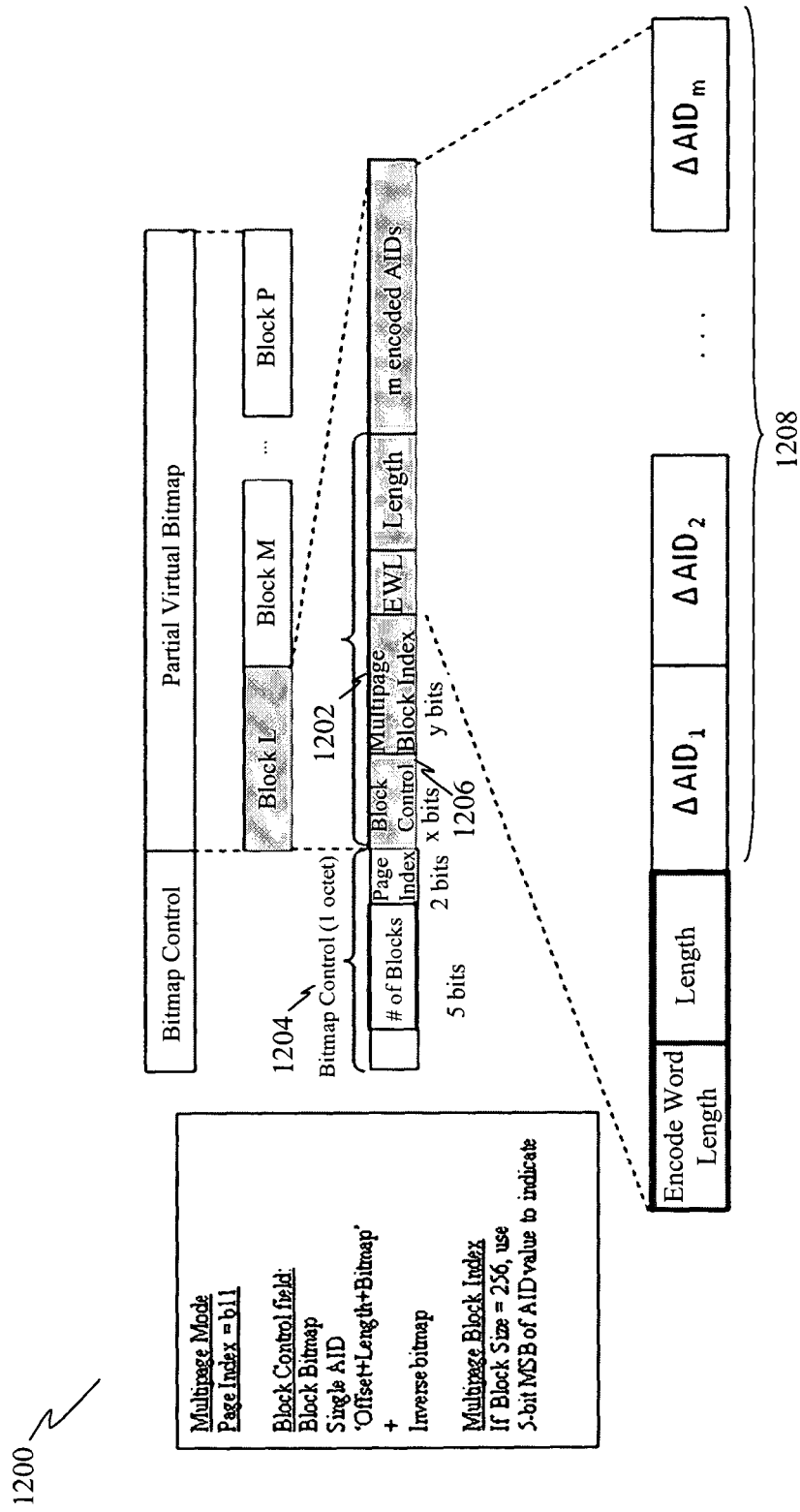
FIG. 12A shows a multipage mode embodiment 1, in accordance to various embodiments.
Figure 12B:
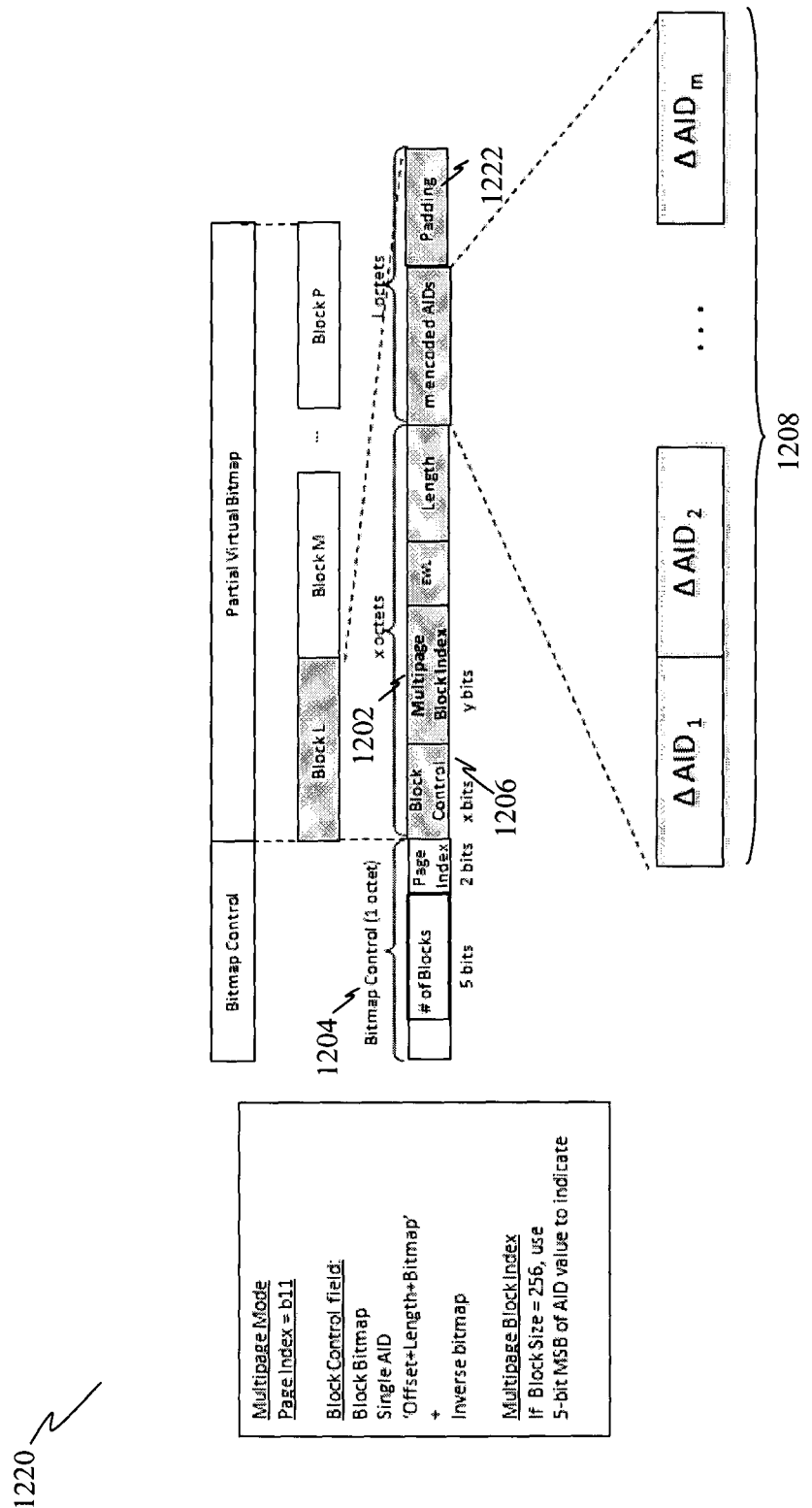
FIG. 12B shows a multipage mode embodiment 1 with a padding field, in accordance to various embodiments.

FIG. 12 shows the multipage mode embodiment 1 1200, where each block is indicated by Multipage Block Index 1202 (unique to all the pages) and the number of blocks may be indicated by 5-bit in Bitmap Control Field 1204 (used by TIM Segment Number as well). Block Control 1206 may be reused. The example shown in FIG. 12 uses the ADE to encode TIM bitmap for each block where there are m AID differential encoding values $\Delta AID_1$, $\Delta AID_2$, ..., $\Delta AID_m$ 1208. It is noted that the block size shown in FIG. 12 may not necessarily be the same as in IEEE 802.11-1137-11-00ah-specification-framework-for-tgah.

Figure 13:
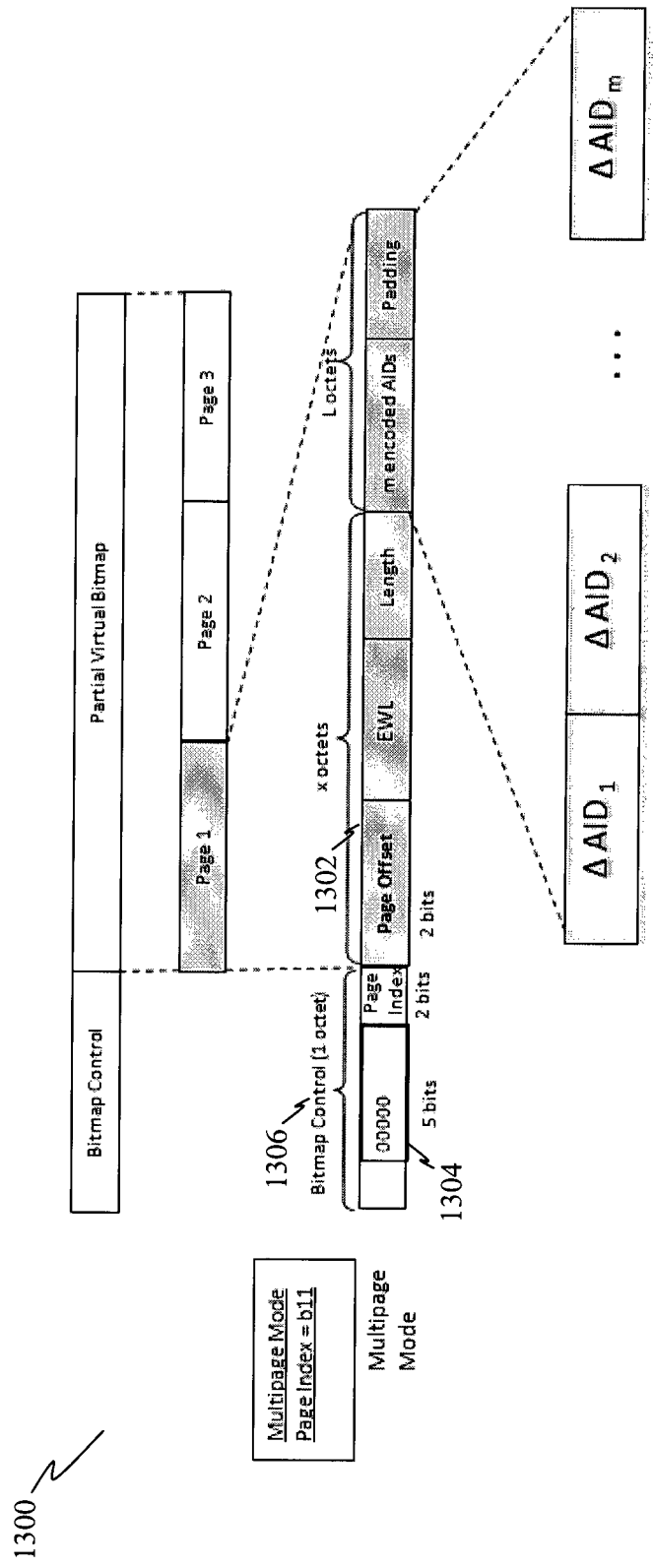
FIG. 13 shows a multipage mode embodiment 2, in accordance to various embodiments.

FIG. 13 shows the multipage mode embodiment 2 1300, where each page is indicated by page offset 1302 and TIM Segment Number field 1304 in Bitmap Control field 1306 may be set b00000. The example shown in FIG. 13 uses the ADE to encode TIM bitmap for each page. It is noted that there is no block level encoding in FIG. 13.

Figure 14:
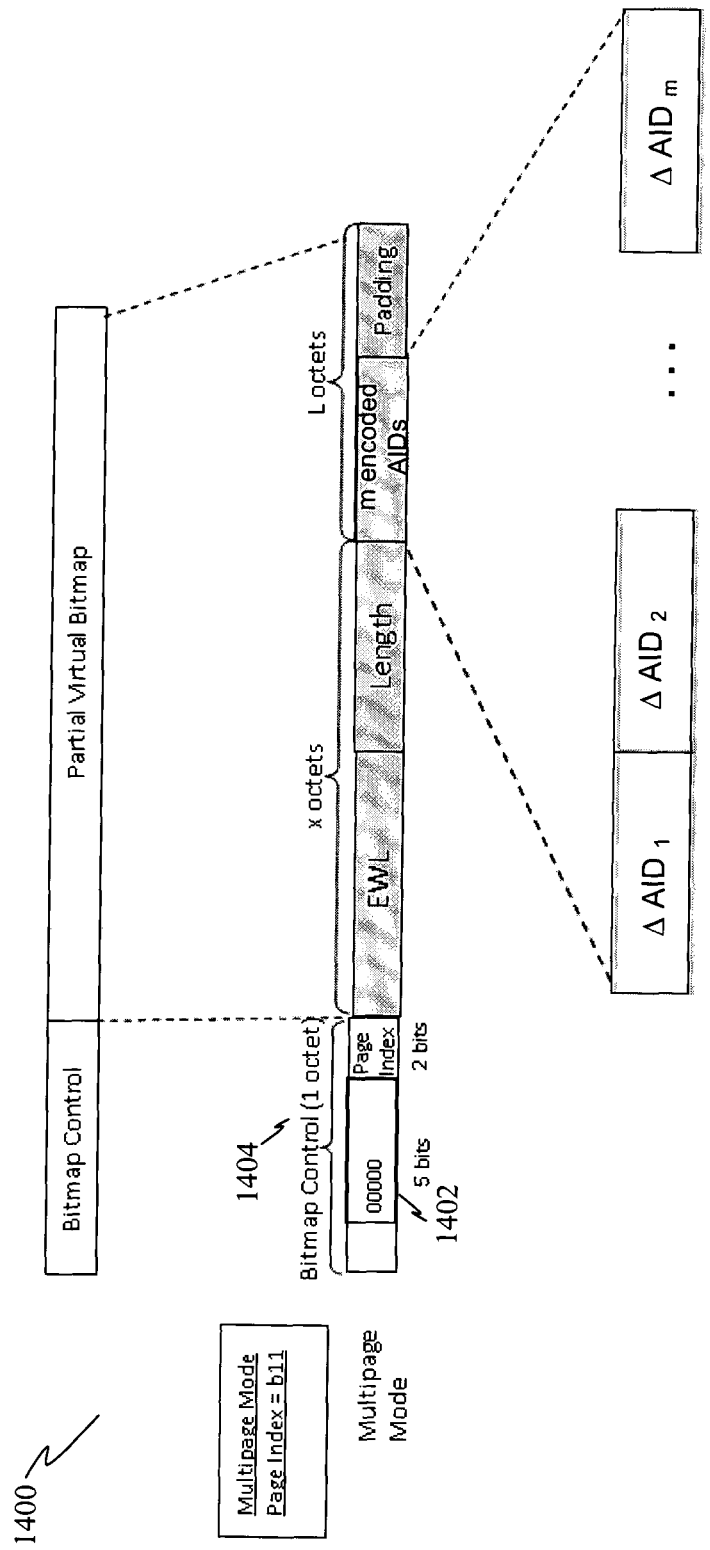
FIG. 14 shows a multipage mode embodiment 3, in accordance to various embodiments.

FIG. 14 shows the multipage mode embodiment 3 1400, where TIM Segment Number Field 1402 in Bitmap Control field 1404 may be set b00000. The example shown in FIG. 14 uses the ADE to encode TIM bitmap. It is noted that there are no pages and blocks in FIG. 14.

Figure 15A:
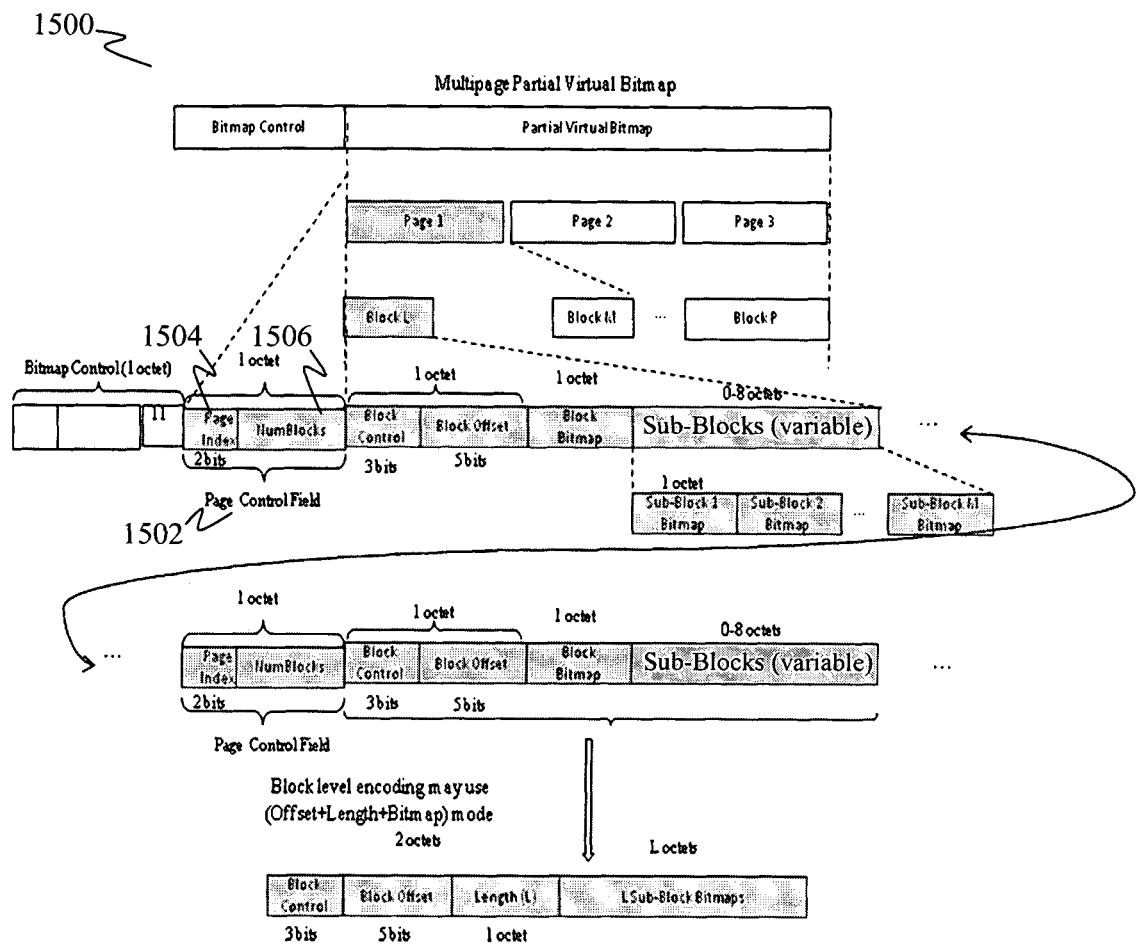
FIG. 15A shows a multipage mode embodiment 4, in accordance to various embodiments.

FIG. 15A shows the multipage mode embodiment 4 1500, where there is one byte defined as Page Control Field 1502 for each page, including two fields: Page Index 1504 indicating the page index in Multipage Mode and NumBlocks 1506 indicating the number of the encoded blocks included in the page. To decode the bitmap for each page, NumBlocks 1506 may be used to identify the last block in the same page and the starting of next page encoding. It is noted that the final encoded bitmap may include a few pages and the block level encoding still follows the methods in IEEE 802.11-1137-11-00ah-specification-framework-for-tgah.

Figure 15B:
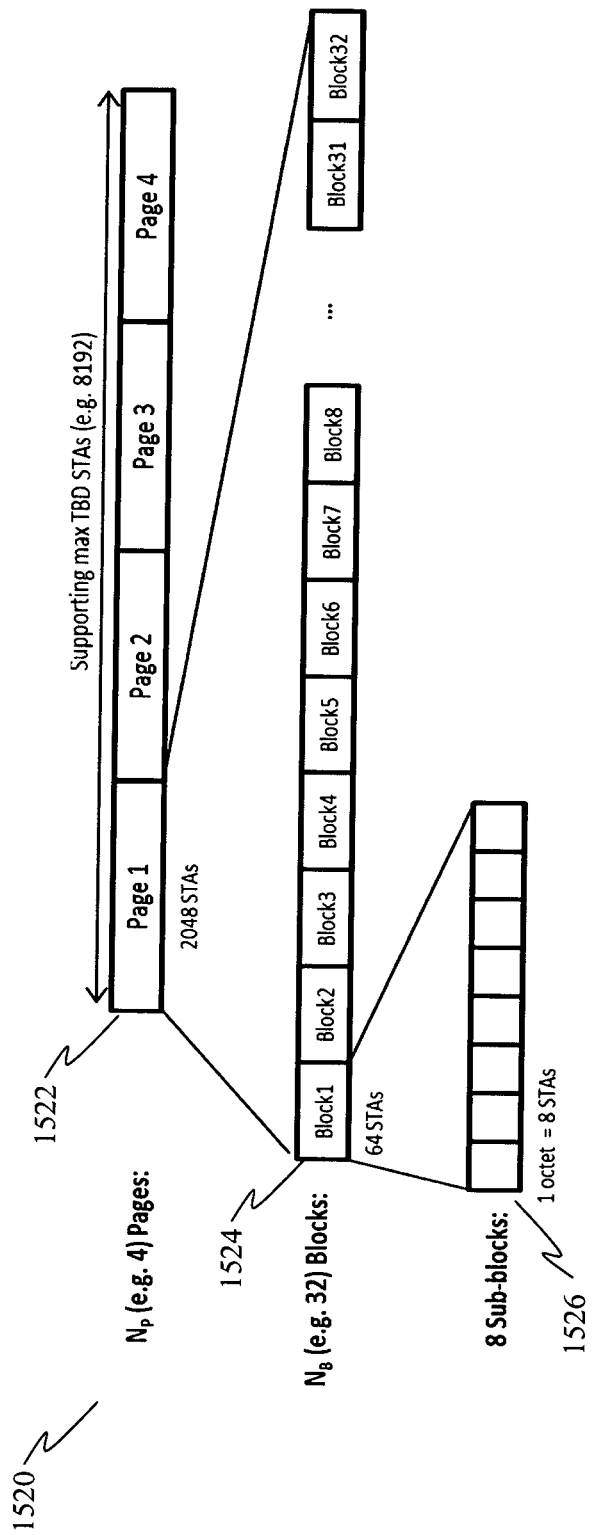
FIG. 15B shows a 3-level structure of page, block and sub-block.

FIG. 15B shows a 3-level structure 1520 of page 1522, block 1524 and sub-block 1526. In the example of FIG. 15B, the number of pages may be 4, the number of blocks in each page may be 32, and the number of sub-blocks in each block may be 8.

Figure 15C:
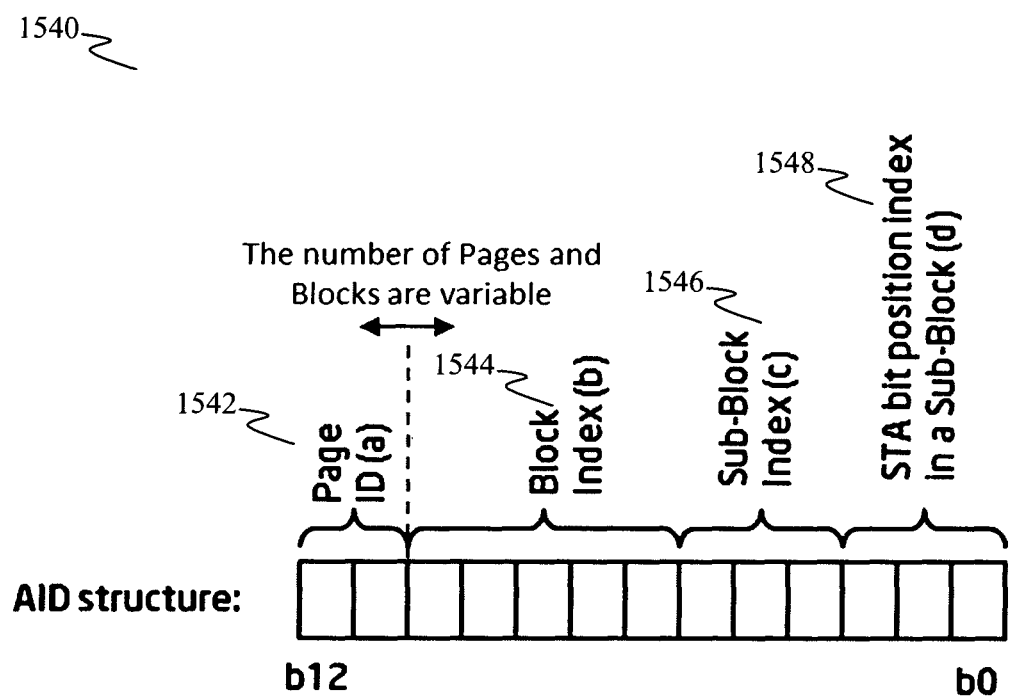
FIG. 15C shows an association identifier (AID) structure depicting a page index.

FIG. 15C shows an AID structure 1540 depicting a page index. In FIG. 15C, the two most significant bits (b11-b12) of the AID 1540 is Page ID or Page Index 1542. The b10-b6 of the AID 1540 are for Block Index (block offset) 1544. The b5-b3 of the AID 1540 are for Sub-block index 1546. The b2-b0 of the AID 1540 are the STA bit position index 1548 in a Sub-Block.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A compression device comprising:
an identifier determination circuit configured to determine a plurality of identifier values in a block, the plurality of identifier values comprising a first identifier value identifying a first communication terminal of a network, and a second identifier value identifying a second communication terminal of the network;
a differential determination circuit configured to determine a differential value based on a difference between the first identifier value and the second identifier value; and
a compressed string generation circuit configured to insert the differential value into a compressed string,
wherein the compressed string generation circuit is configured to insert into the compressed string an encode word length field with a value of 7, which indicate that the number of bits required for representing the block is 8, a length field indicating that the length of the compressed string excluding the encode word length field and the length field is 1, and a sole differential value if data is not present in an access point operating in the network for one communication terminal of a plurality of communication terminals, wherein the one communication terminal is identified by one of the plurality of identifier values; and if data is present in the access point for the rest of the plurality of communication terminals identified by the rest of the plurality of identifier values,
wherein the sole differential value is determined based on a difference between the one of the plurality of communication terminals and a sum of two factors, wherein the first factor is a product of a page index value and a page length, and the second factor is a product of a block offset value and a block length.

2. The compression device of claim 1, wherein for the first communication terminal data is present in an access point operating in the network; and wherein for the second communication terminal data is present in the access point.

3. The compression device of claim 2, further comprising an arranging circuit configured to arrange the first identifier value and the second identifier value in a predetermined order.

4. The compression device of claim 3, wherein the identifier determination circuit is configured to determine a plurality of identifier values;
wherein the arranging circuit is configured to arrange the plurality of identifier values in the predetermined order; and
wherein the plurality of identifier values comprises the first identifier value and the second identifier value which are not arranged at a start position of the predetermined order.

5. The compression device of claim 4, wherein the plurality of identifier values comprises a start identifier value which is arranged at the start position of the predetermined order, wherein the differential determination circuit is configured to determine a start differential value based on a difference between the start identifier value and a reference value.

6. The compression device of claim 5, wherein the reference value is a sum of two factors, wherein the first factor is a product of a page index value and a page length, and the second factor is a product of a block offset value and a block length.

7. The compression device of claim 6, wherein the block offset value is a floor function of the start identifier value divided by the block length.

8. The compression device of claim 2, wherein the compressed string generation circuit is further configured to insert a padding bit into the compressed string.

9. The compression device of claim 1, wherein the size of the encode word length field is 3 bits.

10. The compression device of claim 1, wherein the size of the length field is 5 bits.

11. A compression device comprising:
an identifier determination circuit configured to determine a first identifier value identifying a first communication terminal of a network, and a second identifier value identifying a second communication terminal of the network;
a differential determination circuit configured to determine a differential value based on a difference between the first identifier value and the second identifier value; and
a compressed string generation circuit configured to insert the differential value into a compressed string,
wherein for the first communication terminal data is present in an access point operating in the network;
wherein for the second communication terminal data is present in the access point; wherein the identifier determination circuit is further configured to determine a third identifier value identifying a third communication terminal of the network, wherein for the third communication terminal data is not present in the access point;
wherein the differential determination circuit is further configured to determine an interpolated differential value based on at least one of a difference between the third identifier value and the first identifier value, or a difference between the third identifier value and the second identifier value; and
wherein the compressed string generation circuit is further configured to insert the interpolated differential value and the third identifier value into the compressed string.

12. A compression device comprising:
an identifier determination circuit configured to determine a first identifier value identifying a first communication terminal of a network, and a second identifier value identifying a second communication terminal of the network;
a differential determination circuit configured to determine a differential value based on a difference between the first identifier value and the second identifier value; and
a compressed string generation circuit configured to insert the differential value into a compressed string,
wherein for the first communication terminal data is present in an access point operating in the network;
wherein for the second communication terminal data is present in the access point;
wherein the identifier determination circuit is further configured to determine a third identifier value identifying a third communication terminal of the network and a fourth identifier value identifying a fourth communication terminal of the network, wherein for each of the third communication terminal and the fourth communication terminal data is not present in the access point;

wherein the differential determination circuit is further configured to determine an interpolated differential value based on a difference between the third identifier value and the fourth identifier value; and wherein the compressed string generation circuit is further configured to insert the interpolated differential value, the third identifier value and the fourth identifier value into the compressed string.

13. A compression method comprising:

determining a plurality of identifier values in a block, the plurality of identifier values comprising a first identifier value identifying, a first communication terminal of a network, and a second identifier value identifying a second communication terminal of the network;

determining a differential value based on a difference between the first identifier value and the second identifier value; and inserting the differential value into a compressed string, wherein said inserting the differential value into a compress string comprises:

inserting into the compressed string an encode word length field with a value of 7, which indicate that the number of bits required for representing the block is 8, a length field indicating that the length of the compressed string excluding the encode word length field and the length field is 1, and a sole differential value if data is not present in an access point operating in the network for one communication terminal of a plurality of communication terminals, wherein the one communication terminal is identified by one of the plurality of identifier values; and if data is present in the access point for the rest of the plurality of communication terminals identified by the rest of the plurality of identifier values, wherein the sole differential value is determined based on a difference between the one of the plurality of communication terminals and a sum of two factors, wherein the first factor is a product of a page index value and a page length, and the second factor is a product of a block offset value and a block length.

* * * * *